US012579004B1

(12) United States Patent　　　　(10) Patent No.:　US 12,579,004 B1
Kumar et al.　　　　　　　　　　　　(45) Date of Patent:　　Mar. 17, 2026

(54) CAPACITY PLANNING AND SCALING OF SERVICE-ORIENTED APPLICATIONS IMPLEMENTED USING MULTI-TENANT RESOURCES

(71) Applicant: Amazon Technologies, Inc., Seattle, WA (US)

(72) Inventors: Vikash Kumar, Ranchi (IN); Ashok Chitta, Hyderabad (IN); Manoj Bhagwan Jadhav, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 587 days.

(21) Appl. No.: 18/064,902

(22) Filed: Dec. 12, 2022

(51) Int. Cl.
G06F 9/50　　　　(2006.01)
G06F 9/455　　　(2018.01)

(52) U.S. Cl.
CPC .......... G06F 9/5072 (2013.01); G06F 9/5077 (2013.01); G06F 9/5083 (2013.01); G06F 2009/45562 (2013.01); G06F 2009/4557 (2013.01); G06F 2209/501 (2013.01); G06F 2209/5019 (2013.01)

(58) Field of Classification Search
None
See application file for complete search history.

(56) References Cited

U.S. PATENT DOCUMENTS

| | | | | |
|---|---|---|---|---|
| 7,082,606 | B2 * | 7/2006 | Wood | G06F 9/5038 |
| | | | | 710/200 |
| 7,369,981 | B1 * | 5/2008 | Saghier | G06F 11/3409 |
| | | | | 703/2 |
| 7,689,694 | B2 * | 3/2010 | Kato | G06F 9/5044 |
| | | | | 709/227 |
| 8,978,035 | B2 | 3/2015 | McGrath et al. | |
| 9,547,534 | B2 * | 1/2017 | Dettori | G06F 9/5072 |
| 9,590,879 | B2 | 3/2017 | Wray | |
| 9,842,039 | B2 | 12/2017 | Siciliano et al. | |
| 10,133,608 | B2 | 11/2018 | Sapuram et al. | |
| 10,304,019 | B2 | 5/2019 | Abuelsand et al. | |
| 10,725,886 | B2 | 7/2020 | Savolainen | |
| 11,416,450 | B1 * | 8/2022 | Du | H04L 9/0894 |
| 2006/0179106 | A1 * | 8/2006 | Turner | G06F 9/5072 |
| | | | | 709/201 |
| 2012/0173709 | A1 | 7/2012 | Li et al. | |
| 2013/0073610 | A1 * | 3/2013 | Maclinovsky | G06Q 30/04 |
| | | | | 709/203 |

(Continued)

*Primary Examiner* — Abu Zar Ghaffari

(74) *Attorney, Agent, or Firm* — Robert C. Kowert; Kowert, Hood, Munyon, Rankin & Goetzel, P.C.

(57)　　　　　　　　ABSTRACT
A request to perform scalability analysis of a constituent service of an application at a first deployment environment is received. The constituent service is deployed to a plurality of host groups of the deployment environment. A data set which indicates a collection of front end request routers configured to distribute service requests among hosts of a collection of deployment environments including the first deployment environment is obtained. Analysis of the data set is used to identify a resource scaling unit which indicates a set of host groups, including a particular host group of the plurality of host groups, such that individual hosts within the set of host groups have the same estimated workload level as other hosts within the set of host groups. A representation of the resource scaling unit is stored.

20 Claims, 9 Drawing Sheets

(56)     References Cited

U.S. PATENT DOCUMENTS

| 2014/0019966 | A1* | 1/2014 | Neuse .................... | G06F 9/5077 |
| | | | | 718/1 |
| 2017/0331705 | A1 | 11/2017 | Jiang et al. | |
| 2020/0160246 | A1* | 5/2020 | Pandey ................... | G06Q 10/06 |
| 2021/0152632 | A1* | 5/2021 | Brandwine ......... | H04L 67/1097 |
| 2021/0224114 | A1 | 7/2021 | Maiya Belur et al. | |
| 2021/0303985 | A1* | 9/2021 | Lakshmikantha ..... | G06N 3/044 |
| 2022/0129316 | A1* | 4/2022 | Sheoran ................ | G06F 9/5083 |
| 2022/0171646 | A1* | 6/2022 | Birsan .................. | G06F 9/45558 |
| 2023/0289211 | A1* | 9/2023 | Hirota .................... | G06F 9/4843 |

* cited by examiner

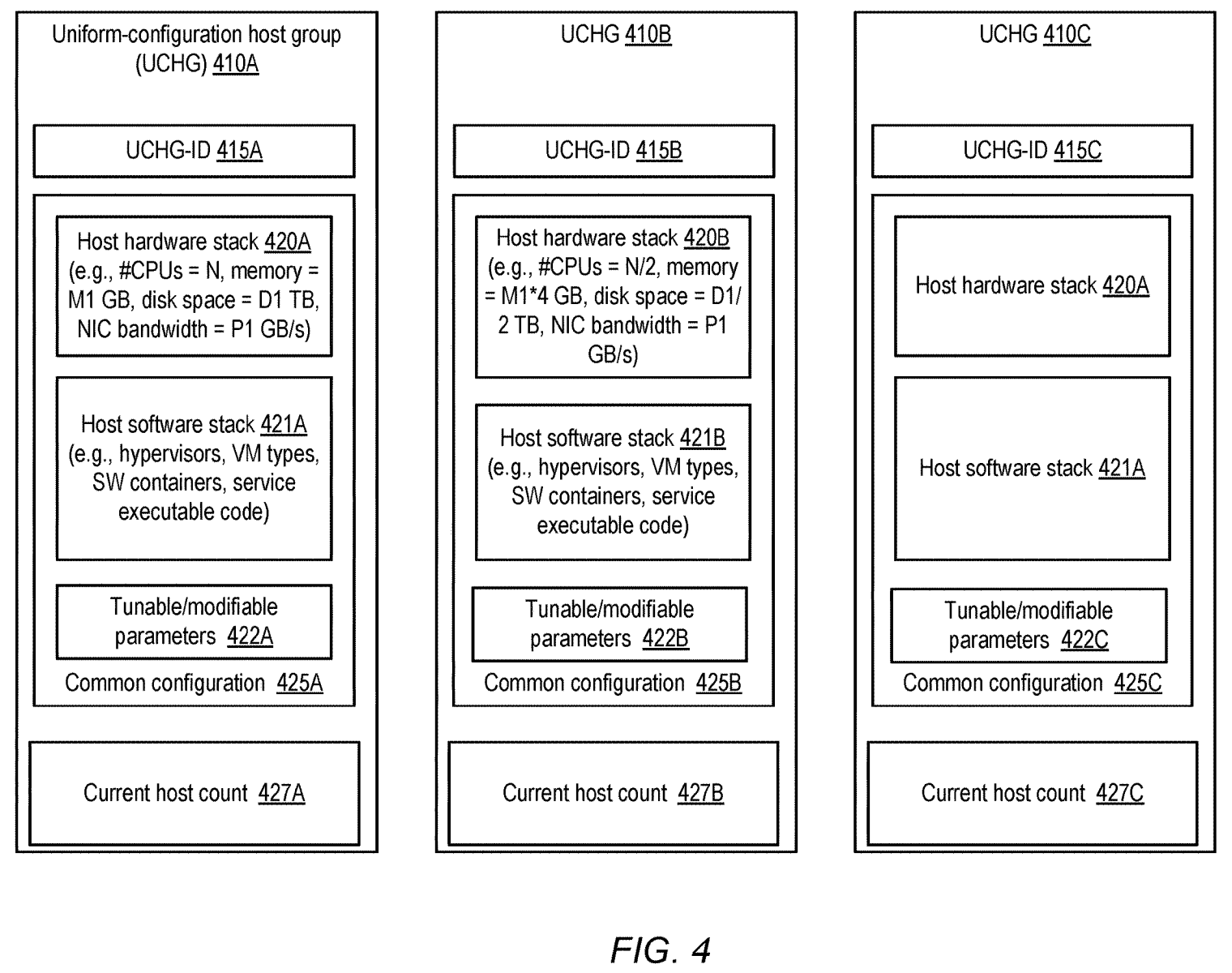

UCHG 410C

UCHG-ID 415C

Host hardware stack 420A

Host software stack 421A

Tunable/modifiable parameters 422C

Common configuration 425C

Current host count 427C

UCHG 410B

UCHG-ID 415B

Host hardware stack 420B
(e.g., #CPUs = N/2, memory = M1*4 GB, disk space = D1/2 TB, NIC bandwidth = P1 GB/s)

Host software stack 421B
(e.g., hypervisors, VM types, SW containers, service executable code)

Tunable/modifiable parameters 422B

Common configuration 425B

Current host count 427B

Uniform-configuration host group (UCHG) 410A

UCHG-ID 415A

Host hardware stack 420A
(e.g., #CPUs = N, memory = M1 GB, disk space = D1 TB, NIC bandwidth = P1 GB/s)

Host software stack 421A
(e.g., hypervisors, VM types, SW containers, service executable code)

Tunable/modifiable parameters 422A

Common configuration 425A

Current host count 427A

FIG. 4

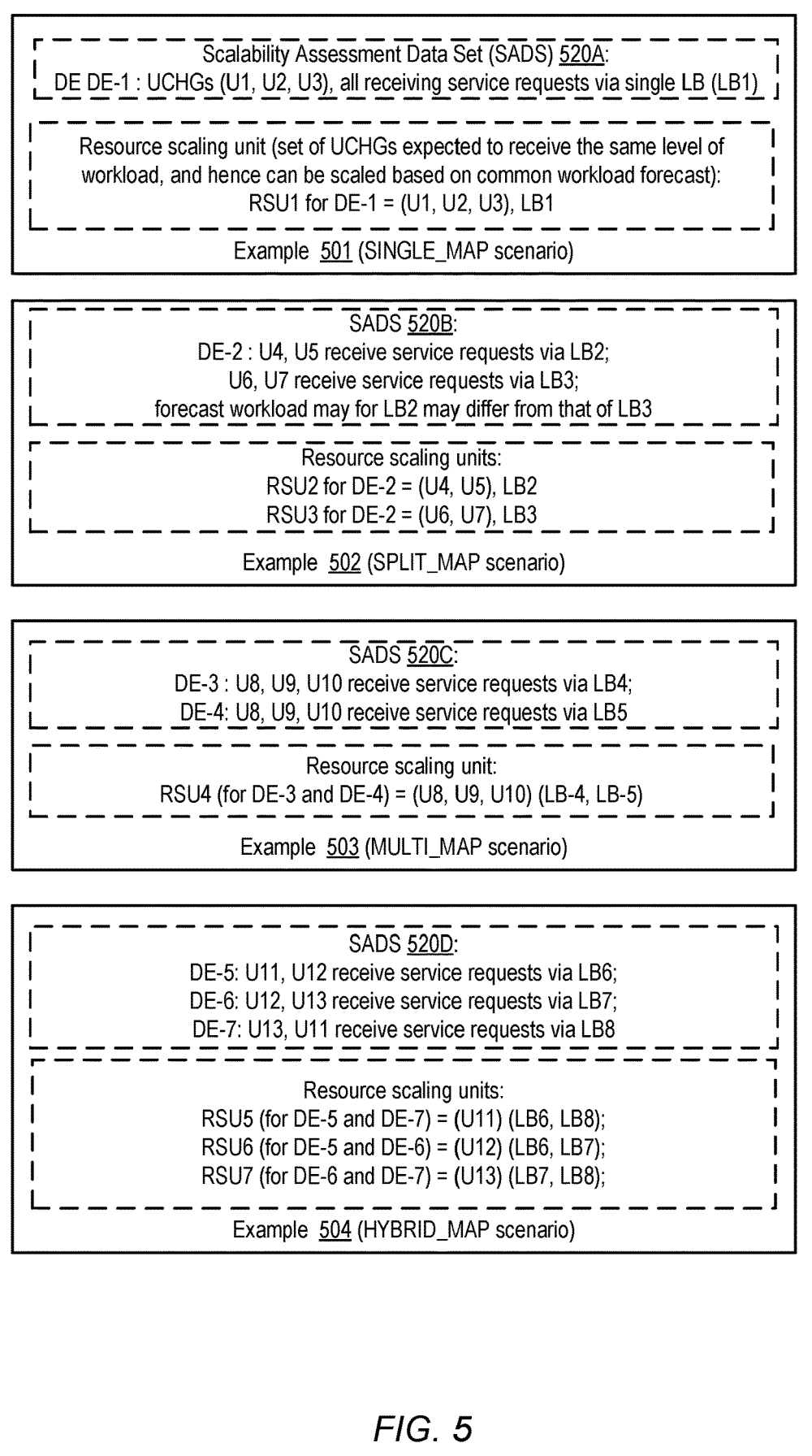

Scalability Assessment Data Set (SADS) 520A:
DE DE-1 : UCHGs (U1, U2, U3), all receiving service requests via single LB (LB1)

Resource scaling unit (set of UCHGs expected to receive the same level of workload, and hence can be scaled based on common workload forecast):
RSU1 for DE-1 = (U1, U2, U3), LB1

Example 501 (SINGLE_MAP scenario)

SADS 520B:
DE-2 : U4, U5 receive service requests via LB2;
U6, U7 receive service requests via LB3;
forecast workload may for LB2 may differ from that of LB3

Resource scaling units:
RSU2 for DE-2 = (U4, U5), LB2
RSU3 for DE-2 = (U6, U7), LB3

Example 502 (SPLIT_MAP scenario)

SADS 520C:
DE-3 : U8, U9, U10 receive service requests via LB4;
DE-4: U8, U9, U10 receive service requests via LB5

Resource scaling unit:
RSU4 (for DE-3 and DE-4) = (U8, U9, U10) (LB-4, LB-5)

Example 503 (MULTI_MAP scenario)

SADS 520D:
DE-5: U11, U12 receive service requests via LB6;
DE-6: U12, U13 receive service requests via LB7;
DE-7: U13, U11 receive service requests via LB8

Resource scaling units:
RSU5 (for DE-5 and DE-7) = (U11) (LB6, LB8);
RSU6 (for DE-5 and DE-6) = (U12) (LB6, LB7);
RSU7 (for DE-6 and DE-7) = (U13) (LB7, LB8);

Example 504 (HYBRID_MAP scenario)

*FIG. 5*

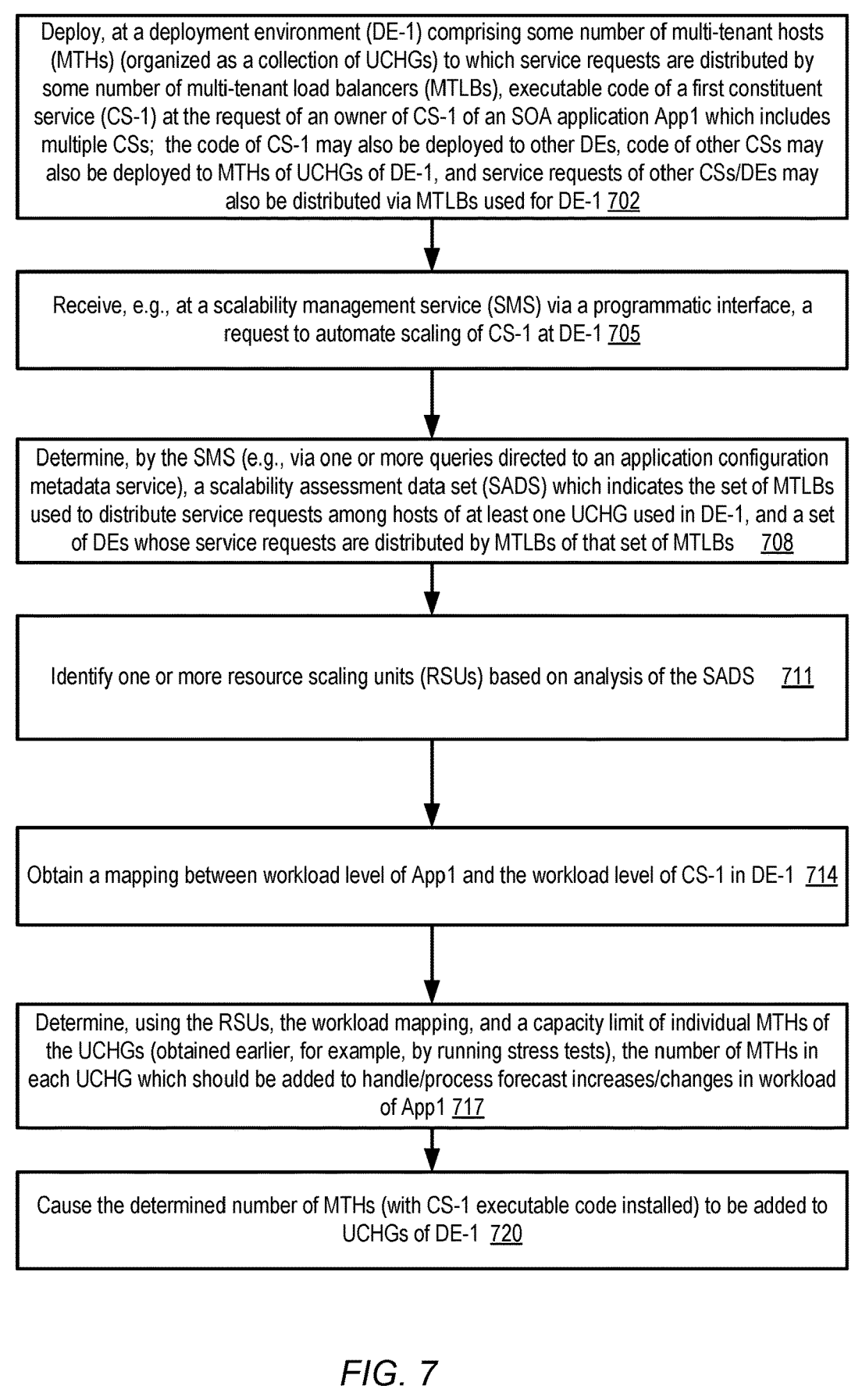

Deploy, at a deployment environment (DE-1) comprising some number of multi-tenant hosts (MTHs) (organized as a collection of UCHGs) to which service requests are distributed by some number of multi-tenant load balancers (MTLBs), executable code of a first constituent service (CS-1) at the request of an owner of CS-1 of an SOA application App1 which includes multiple CSs; the code of CS-1 may also be deployed to other DEs, code of other CSs may also be deployed to MTHs of UCHGs of DE-1, and service requests of other CSs/DEs may also be distributed via MTLBs used for DE-1 702

Receive, e.g., at a scalability management service (SMS) via a programmatic interface, a request to automate scaling of CS-1 at DE-1 705

Determine, by the SMS (e.g., via one or more queries directed to an application configuration metadata service), a scalability assessment data set (SADS) which indicates the set of MTLBs used to distribute service requests among hosts of at least one UCHG used in DE-1, and a set of DEs whose service requests are distributed by MTLBs of that set of MTLBs 708

Identify one or more resource scaling units (RSUs) based on analysis of the SADS 711

Obtain a mapping between workload level of App1 and the workload level of CS-1 in DE-1 714

Determine, using the RSUs, the workload mapping, and a capacity limit of individual MTHs of the UCHGs (obtained earlier, for example, by running stress tests), the number of MTHs in each UCHG which should be added to handle/process forecast increases/changes in workload of App1 717

Cause the determined number of MTHs (with CS-1 executable code installed) to be added to UCHGs of DE-1 720

*FIG. 7*

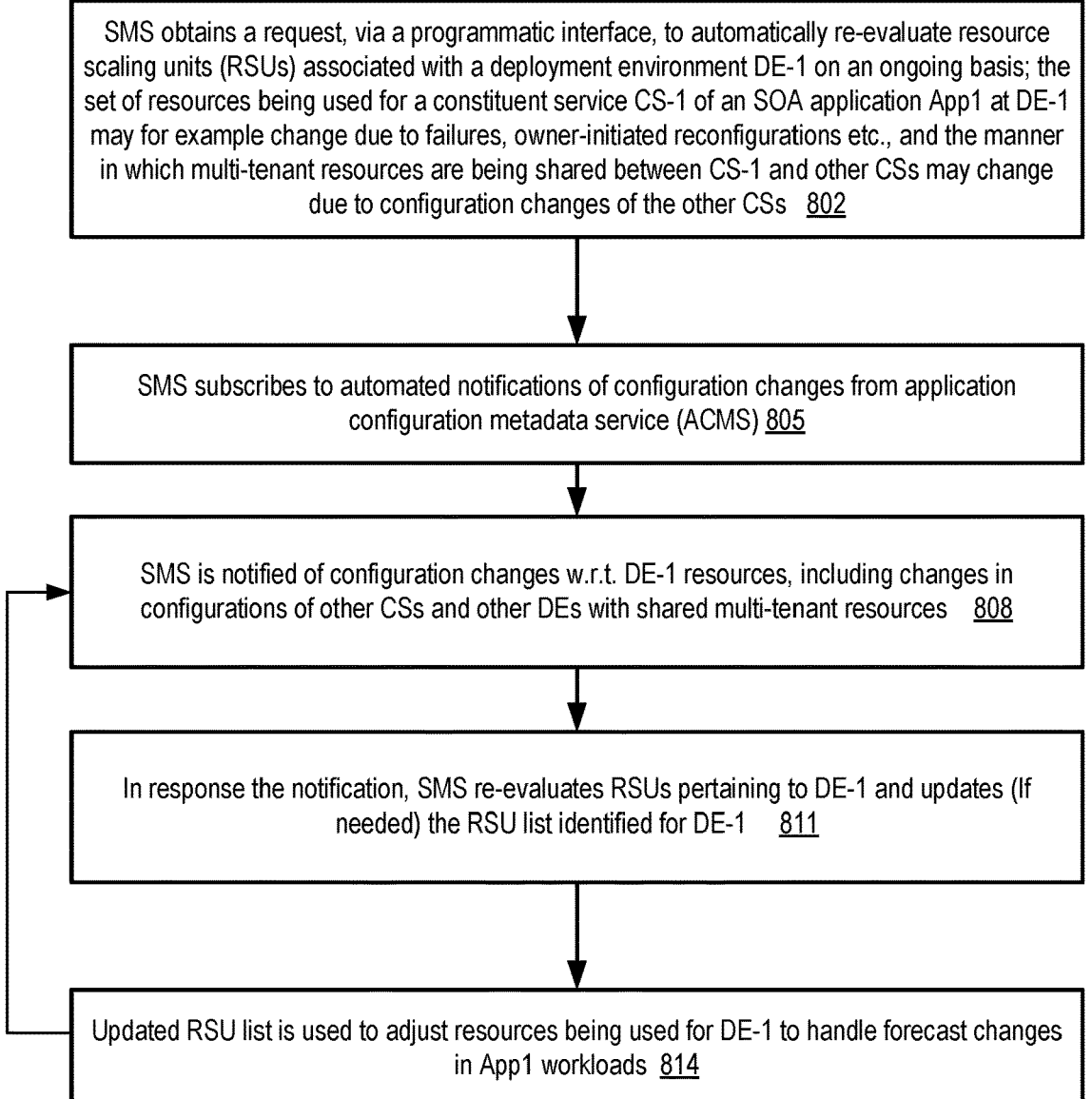

SMS obtains a request, via a programmatic interface, to automatically re-evaluate resource scaling units (RSUs) associated with a deployment environment DE-1 on an ongoing basis; the set of resources being used for a constituent service CS-1 of an SOA application App1 at DE-1 may for example change due to failures, owner-initiated reconfigurations etc., and the manner in which multi-tenant resources are being shared between CS-1 and other CSs may change due to configuration changes of the other CSs   802

SMS subscribes to automated notifications of configuration changes from application configuration metadata service (ACMS) 805

SMS is notified of configuration changes w.r.t. DE-1 resources, including changes in configurations of other CSs and other DEs with shared multi-tenant resources   808

In response the notification, SMS re-evaluates RSUs pertaining to DE-1 and updates (If needed) the RSU list identified for DE-1   811

Updated RSU list is used to adjust resources being used for DE-1 to handle forecast changes in App1 workloads 814

CAPACITY PLANNING AND SCALING OF SERVICE-ORIENTED APPLICATIONS IMPLEMENTED USING MULTI-TENANT RESOURCES

BACKGROUND

Large distributed applications are often implemented as a collection of smaller-scale services. The services which collectively form the larger application, referred to as constituent services, typically each present a set of application programming interfaces (APIs) that can be invoked from the other services to achieve the overall functionality of the application. This approach, referred to as service-oriented architecture (SOA), has many benefits such as enabling small agile teams of software engineers to focus on enhancing features of the individual services constituting the application, making updates more manageable, reducing the risks and impacts of failures, making debugging easier, and so on.

Some large-scale SOA applications, such as applications used for managing financial transactions, e-commerce sites, and the like may include hundreds of interacting constituent services. The service requests directed to the constituent services of an SOA application (e.g., from other services of that application, or from end users of the applications) are often distributed among numerous types of multi-tenant hosts used for the services via multi-tenant load balancers or front end request routers. A given multi-tenant host can be used to process workloads of multiple constituent services, potentially of different applications, and a given load balancer or request router may also be used to distribute service requests for several constituent services. As a result of such multi-tenancy, making capacity planning and scaling decisions (e.g., decisions as to how many addition hosts of a particular category should be added to a constituent service deployment to handle an anticipated increase in the workload level of the parent SOA application) accurately can become a non-trivial technical challenge.

BRIEF DESCRIPTION OF DRAWINGS

FIG. 4 illustrates examples of uniform-configuration host groups into which the resources used for constituent services of an SOA application may be classified, according to at least some embodiments.

FIG. 5 illustrates examples of resource scaling units which may be identified for constituent services of an SOA application by a scalability management service based on analysis of multi-tenant use of resources, according to at least some embodiments.

FIG. 6 is a flow diagram illustrating aspects of operations that may be performed to identify resource scaling units for constituent services of an SOA application implemented using multi-tenant resources, according to at least some embodiments.

FIG. 7 is a flow diagram illustrating aspects of operations that may be performed to automate scaling of SOA applications in response to requests from constituent service owners, according to at least some embodiments.

FIG. 8 is a flow diagram illustrating aspects of operations that may be performed to automatically re-evaluate resource scaling units for constituent services of an SOA application on an ongoing basis, according to at least some embodiments.

Figure 9:
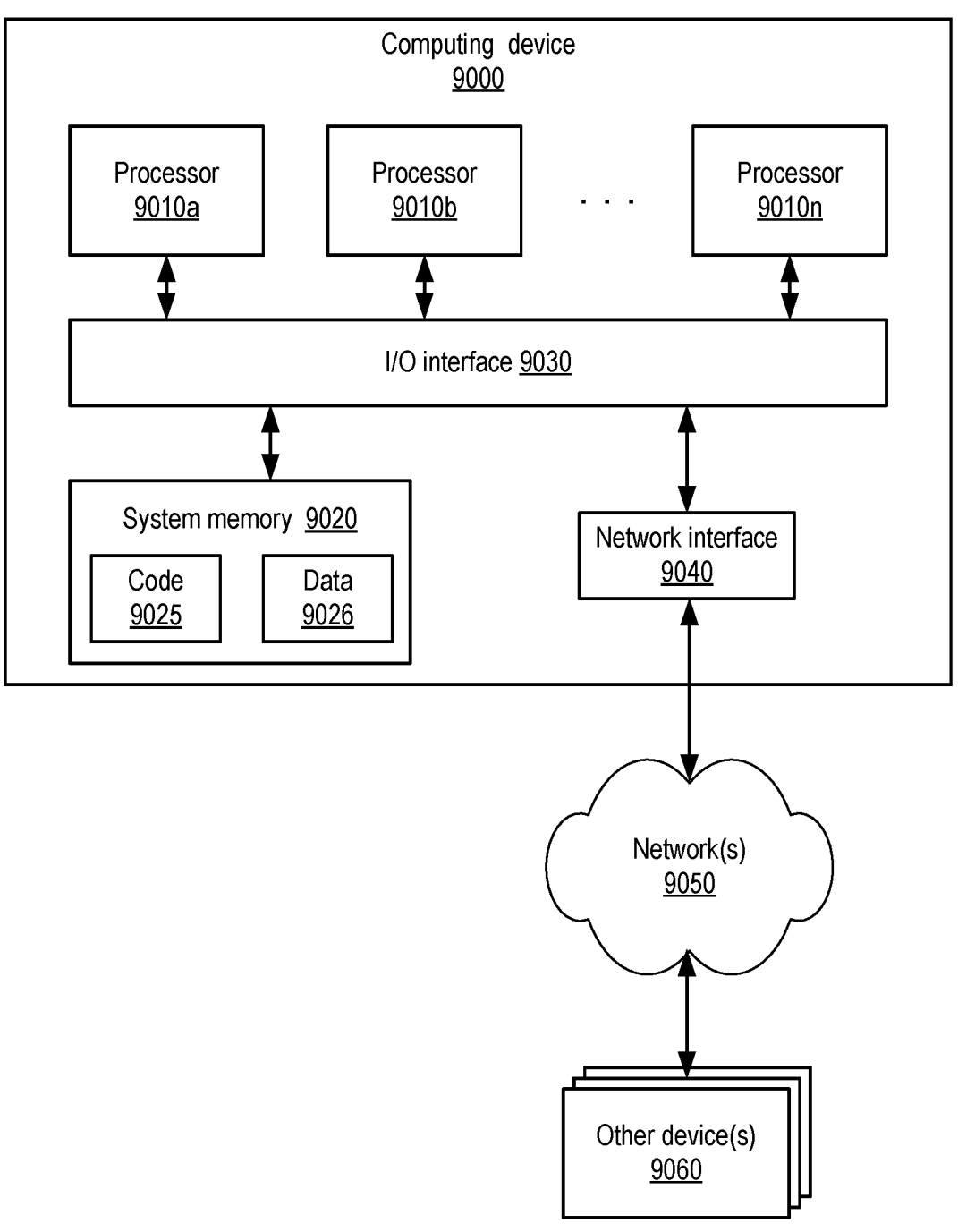

FIG. 9 is a block diagram illustrating an example computing device that may be used in at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to methods and apparatus for enabling accurate capacity planning and automated scaling of large-scale distributed applications which include numerous lower-level services executed using several types of multi-tenant resources, including multi-tenant hosts to which service requests are distributed by multi-tenant load balancers. In many cases the multi-tenant resources can be acquired from a cloud provider network or cloud computing environment, at which multi-tenancy (concurrent use of a given resource on behalf of several different applications, services or clients) is often employed for a variety of reasons, e.g., to help increase overall resource utilization levels and reduce costs incurred by clients. Distributed applications implemented as a collection of lower-level services are said to implement a service-oriented architecture (SOA), and are therefore referred to as SOA applications or service-oriented applications. The lower-level services may each implement a part of the overall business logic of the SOA application, and may each implement a set of application programming interfaces (APIs) that can be invoked by other lower-level services or in some cases by end users of the SOA application. Note that an SOA application itself may be accessible to its clients via a network and its own APIs in at least some embodiments, and may thus be considered a service as well. To distinguish the SOA applications from the lower-level services that work together to implement the overall logic of the distributed applications, the lower-level services that constitute or form a distributed application are referred to as constituent services of the distributed application herein. At a high level, a given constituent service can be described as comprising three logical components: an interface (e.g., a set of APIs) that can be used to communicate with it, a contract or protocol which defines the expected types of responses or behaviors expected from the constituent service and its users in response to different interactions via the interface, and an implementation comprising the actual software or code of the constituent service. A large SOA application, such as an application used to implement a portion or all of an e-retail store, a supply-chain management application for an industry or organization, a warehouse management application, or an application for managing a financial institution's transactions may comprise hundreds or even thousands of constituent services in some cases.

A given resource such as a host or a load balancer can be employed for several different constituent services of one or more SOA applications being implemented using a common or shared resource collection (e.g., a cloud provider network's fleet of resources). A given resource may even be used for several distinct instances of the same constituent service being run for different purposes (e.g., to process application requests originating within distinct regions or locations, or to execute different stages of a development and testing pipeline of the SOA application) in respective deployment environments. The term "deployment environment", as used herein, refers to a set of resources which is used for a particular running instance of a constituent service of an SOA application, where the particular running instance of the constituent service is responsible for processing service requests from a corresponding set of service request sources. Thus, in one simple example, a given constituent service CS-1 of an SOA application App1 may be concurrently run at two deployment environments: DE-1 and DE-2. DE-1 may comprise a first set of hosts SH1 (which may itself be divided into one or more uniform-configuration host groups as discussed below) at which the executable code of CS-1 runs, such that service requests received from a request source set RSS1 are distributed among SH1 hosts via some set of load balancers LB1. DE-2 may comprise a second set of hosts SH2 at which the executable code of the service runs, such that service requests received from a different request source set RSS2 are distributed among SH2 hosts via some set of load balancers LB2. Individual hosts of SH1 and/or SH2, as well as individual load balancers of LB1 and/or LH2, may be configurable in multi-tenant mode. They may therefore potentially be used for multiple CSs, and may potentially belong to multiple deployment environments. As such, it may not always be straightforward to predict how exactly the workload experienced at a given host being used for a given CS in a given deployment environment is likely to change, since the total workload experienced at that host may also depend on changes in workloads of other deployment environments of other CSs, and/or on the manner in which load balancers are configured to distribute service requests of various deployment environments.

Each constituent service of an SOA application may have an associated service owner, authorized to select at least an initial set of resources to be used for a deployment environment of that constituent service, and cause executable code of the constituent service to be deployed and run at the selected set of resources. For the initial deployment, the service owner may select hosts or resources belonging to some number of uniform-configuration host groups (UCHGs) in some embodiments. Each such UCHG may include some number of hosts which share common configuration elements—e.g., hosts of one UCHG may all have the same number and type of CPUs, the same amount of memory, the same software stack, common values for tunable configuration settings, and so on. In some embodiments, each UCHG may be assigned a respective group name or identifier to simplify resource administration, so that hosts can be referred to collectively using their parent UCHG's identifier rather than by using host-specific identifiers. In at least one embodiment, hosts in several host groups being used for a given deployment of a given constituent service may all have identical configurations; that is, UCHGs U1 and U2 may differ only in their respective UCHG identifiers and the number of hosts currently included in U1 and U2.

For at least some SOA applications, forecasts may be generated for the application-level workload, e.g., using various types of machine learning models trained using records of application transactions collected over various time intervals. The records includes in the training set may contain respective timestamps in some embodiments, and a class of machine learning models referred to as time series forecasting models may be employed in such embodiments. Other types of machine learning models may be used in different embodiments to generate application-level forecasts, also referred to as business driver forecasts in some cases. From such application-level forecasts, constituent-service level forecasts may in turn be generated, e.g., based on formulas determined automatically (e.g., based on analysis of log records of constituent service API calls) or provided/approved by service owners that take into account the number of constituent-service API calls of various kinds that result from a given transaction request of an end user at the application level. However, because of the potential multi-tenant configuration of the underlying resources, where a given host or a given load balancer may be being used for multiple constituent services or multiple deployment environments, the workload level of service requests experienced by hosts of a given UCHG may in general differ from the workload level experienced by other UCHGs being used for a given deployment environment of a given constituent service. As a result, determining the number of hosts of a given UCHG that should be added to handle a forecast increase in the workload of the constituent service may not be straightforward. For example, if it turns out that a given UCHG's hosts are receiving service requests directed to two different constituent services, and that not all the service requests for a given constituent service are being directed to that UCHG alone, then adjusting the number of hosts in the UCHG based on predicted increases in a single service's workload level may not be effective. Adjustments based on inaccurate understanding of the impact of changes in workload can in turn lead to wastage of resources (if too many additional resources are acquired) or poor application end user experience (if too few resources are acquired).

Accordingly, in various embodiments, a scalability management service (SMS) may be employed to (e.g., in addition to performing other scalability-related tasks) identify resource scalability units (RSUs) for various deployment environments of various constituent services. In effect, the SMS may extract relevant multi-tenancy configuration information from one or more sources, such as an application configuration metadata service, and use that information to define one or more RSUs. Each such RSU may indicate a set of one or more UCHGs, such that hosts within all the UCHGs indicated in a given RSU are expected to have the same workload levels associated with one or more currently-defined deployment environments and one or more load balancers. RSUs may also be referred to as service capacity planning units or SCPUs. In some embodiments, a given RSU may be defined or specified as a 3-element tuple: [{the set of UCHGs whose hosts have been identified as having the same level of estimated anticipated workloads}, {a set of load balancers that distributed service requests to the hosts of the set of UCHGs} and {a set of deployment environments at whose request sources the service requests originate}]. Once such RSUs are identified, workload changes of the higher-level SOA application can be accurately tied to (e.g., predictable using a formula based on) changes in predicted workloads of one or more deployment environments being used for one or more constituent services of the SOA application. The number of hosts which needs to be added to each UCHG indicated in the RSUs can be computed separately for a given forecast increase in workload, and that number of hosts can be added to each UCHG to prepare the system to handle the forecast increase. In at least some embodiments, the SMS may provide an indication to an owner of a given constituent service, via programmatic interfaces, of the RSUs identified for that constituent service, and/or obtain approval of the formulas that are to be used to estimate the number of hosts to be added for a given increase in SOA application workload. The SMS may in some embodiments cause the additional hosts to be added automatically to the deployment environments in view of forecast increases in workload levels, and/or also automatically cause hosts to be removed in the event of forecast reductions in workload levels. Often, the workload change forecasts at the SOA application level may be obtained reasonably far in advance (e.g., weeks or months in case of some seasonally-affected workload patterns, or patterns that may be affected by special events such as promotions or sales), enabling timely acquisition and procurement of additional resources as needed.

In at least some embodiments, if desired, the SMS may be utilized in a simulation mode, in which proposals for resource changes for a deployment environment or a constituent service are identified (using identified RSUs) without actually implementing the changes. The proposed changes may be provided to service owners via programmatic interfaces, and the changes may be put into effect if the service owners approve.

As one skilled in the art will appreciate in light of this disclosure, certain embodiments may be capable of achieving various advantages, including some or all of the following: (a) enabling resource adjustments to be planned and made accurately in advance of forecast changes in workload levels of large-scale distributed applications, thereby ensuring that end user experiences of customers of the applications remain satisfactory, without over-provisioning or under-provisioning resources and/or (b) enabling high level of resource utilizations for resources configured in a multi-tenant manner, thereby reducing the total number of computing, memory and other resources that are utilized for the large-scale distributed applications.

According to some embodiments, a system may include one or more computing devices. The one or more computing devices may include instructions that upon execution on or across the one or more computing devices deploy, at a first deployment environment (DE), executable code of a first constituent service (CS) of an application implementing SOA. The SOA application may include a plurality of interconnected CSs. In various embodiments, the first DE may comprise multi-tenant resources selected from a shared fleet of multi-tenant resources (e.g., resources which can be acquired from or assigned by one or more network-accessible services of a cloud computing environment or cloud provider network) available for CSs of a plurality of applications. The multi-tenant resources of the first DE may include a plurality of uniform-configuration host groups (UCHGs) in some embodiments; an individual UCHG may comprise multiple multi-tenant hosts with a common configuration. Executable code of the first CS may be deployed to the hosts of each UCHG of the first DE. Executable code of the first CS may also be deployed at other DEs in some embodiments; the DEs may differ from each other for example in that service requests for the first constituent service may be directed to the respective DEs from respective sets of request sources (e.g., computing devices from which clients can submit requests to the SOA application, computing devices at which other CSs of the SOA are running, test load generators for the SOA application, etc.). For example, service requests for the first CS may be directed to hosts of UCHGs of a first DE, DE-1 from a first set of devices or request sources RS1, and service requests for the first CS may be directed to hosts of UCHGs of a second DE, DE-2 from a second set of devices or request sources RS2.

A request to automate scaling of the first CS at one or more DEs, including the first DE, in response to forecast changes in workload level of the SOA application may be received in various embodiments, e.g. from a service owner of the first CS or a deployment environment manager of the first DE via programmatic interfaces of a scalability management service (SMS). The SMS may be one among several network-accessible services (e.g., including a virtualized computing service, a storage service and the like) implemented using resources of a cloud provider network in one embodiment. The request may in some embodiments include an identifier of the first DE, but may not necessarily specify configuration details such as the UCHGs in use at the first DE for the first CS. In some embodiments, a more general request to perform scalability analysis of the first CS may be submitted by the service owner, and various steps of analysis and automation of the scaling may be initiated at the SMS in response to the scalability analysis request.

In at least some embodiments, the SMS may determine or obtain a scalability assessment data set to respond to the request. In one embodiment, an application configuration metadata service (ACMS) may include information about the set of CSs being implemented for various SOA applications, the set of DEs at which the CSs are each being executed, the load balancers configured within each DE for transmitting requests to the various UCHGs of the DEs, and so on, and the scalability assessment data set may be obtained in response to one or more queries directed to the ACMS. The scalability assessment data set may, for example, indicate (a) a first collection of multi-tenant load balancers (LBs) configured to distribute service requests of one or more CSs among hosts of various UCHGs of the plurality of UCHGs of the first DE and (b) a first collection of DEs whose service requests are distributed at least in part by one or more LBs of the first collection of LBs. In one embodiment, at least a portion of the scalability assessment data set may be obtained at the SMS by analysis of logs of network traffic of the CSs at various multi-tenant resources.

The SMS may identify, based at least in part on analysis of the scalability assessment data set, one or more RSUs applicable to the first DE in various embodiments. A given RSU may, in some embodiments, indicate a set of UCHGs, a set of DEs and a set of LBs, such that the UCHGs, DEs and LBs satisfy the following conditions. Individual hosts in the set of UCHGs may be expected or predicted to have the same estimated workload level of service requests as other hosts of the set of UCHGs; the workload of service requests of an individual host of the set of UCHGs may be trans- mitted to the individual host by each LB of the set of LBs; and the workload of service requests of an individual host of the set of UCHGs may be received from service request sources of each DE of the set of DEs. Furthermore, in at least some embodiments, each UCHG of the plurality of UCHGs of the first DE may be indicated in at least one RSU of the one or more RSUs identified by the SMS, so that none of the UCHGs are left unrepresented in the RSUs.

In response to obtaining a forecast of a change in work- load level of the SOA application, in some embodiments the SMS may determine, using at least a particular RSU which was identified by the SMS, a particular number of hosts which are to be added to a particular UCHG indicated in the particular RSU in response to the change in workload level. In at least one embodiment, the SMS may cause the par- ticular number of hosts to be added to the particular UCHG and initiate other tasks to ensure that the change in workload is handled smoothly, such as causing executable code of the first CS to be deployed to the particular number of hosts.

According to some embodiments, the SMS may provide indications of the identified RSUs to authorized service owners/administrators of the CSs, owners/administrators of the SOA applications, administrators of DEs etc., e.g., in response to programmatic requests from the authorized entities. In at least one embodiment, the RSUs may be presented to a service owner to obtain approval via a programmatic interface (such as an API, a command line tool, a graphical user interface or a web-based console) of the RSU, e.g., to make sure that the RSUs appear logical and correct to the service owners, before any scaling action such as acquisition of additional hosts is initiated. In at least some embodiments, an SMS may use similar programmatic inter- faces to obtain approval of one or more formulas for computing the number of hosts that should be deployed for a given workload level change of the SOA application. Such formulas may in effect translate high-level SOA workload levels (e.g., in transaction requests per second or similar units) to lower-level CS request rates (e.g., API calls of various kinds per higher-level transaction). In some embodi- ments, a given RSU may apply to, and be used to automati- cally scale, multiple DEs being used for CSs of the same SOA application or for CSs of different SOA applications.

Such RSUs may be used to scale each of the DEs to adapt to forecast changes in the corresponding SOA applications' workloads.

In at least one embodiment, the SMS may perform stress tests on hosts of various UCHGs, e.g., to determine the maximum rate of requests, also referred to as capacity limits, which an individual host can sustain; such capacity limits may also be utilized to determine the specific count of hosts that should be added to a given UCHG to deal with forecast increases in workload. The automated scaling analysis tech- niques introduced herein may be employed for a variety of different use cases or SOA application types in different embodiments, such as financial transactions management applications, retail store management applications, supply- chain management applications and/or warehouse manage- ment applications.

SOA applications can be modeled as graphs of CSs, with modes of the graph representing respective CSs and edges representing inter-CS requests sent from one CS to another. If the rate at which requests are going to be received at a given CS is determined, e.g., based on formulas which translate SOA application workload requests to per-CS requests, host capacity limit information etc. as described above, and the number of additional hosts which need to be added to UCHGs being used for such a CS in a given DE to handle an expected increase in overall SOA workload levels is thereby determined, the SMS may also be able to deduce the additional resources which may need to be obtained for other CSs of the SOA application. For example, the SMS may be able to determine, e.g., based on analysis of log records associated with each of the CSs of the SOA appli- cation, that for each API request of a particular type which is directed to a particular CS CS-1 of the application, N API requests of a different type may be made to a different CS CS-2. Using such mappings between the respective work- load levels of different CSs of an SOA application graph, and information about the UCHGs being used at each CS and the capacity limits of the hosts of those UCHGs, the number of hosts that need to be added to several other CSs may be computed at the SMS in some embodiments.

In some embodiments, in order to be able to process an increase in workload forecast for an SOA application, resources other than hosts may be added, including for example load balancers, database resources, storage resources, and the like. Load balancers may represent one example of front end request routers used for distributing service requests of CSs; for example, in some cases, services requests may be routed based at least partly on partitioning keys indicated in the service requests, so the workload may be distributed using factors other than simply load balancing algorithms per se. In some embodiments, the scalability management techniques introduced herein may be applied to other types of front end request routers, instead of or in addition to, load balancers. Some SOA applications may utilize network-accessible services of a cloud computing environment, such as database services, object storage ser- vices and the like, so an increase in the workload of an SOA application may require corresponding changes at the other services—e.g., additional database instances or storage devices may be set up automatically if needed. In some embodiments, in addition to changing the number of resources deployed, one or more types of configuration settings may also be changed automatically to handle fore- cast changes in workloads. Such settings may include, among others, limits on the number or count of worker threads that can be used concurrently for a multi-threaded task of a constituent service, rate limits for requests submitted between different constituent services of the SOA application and rate limits for requests submitted by a given constituent service to a cloud-based service.

As mentioned above, an SMS of the kind described above may be implemented at least in part using resources of a provider network in some embodiments. A cloud provider network (sometimes referred to simply as a "cloud" or a cloud computing environment) refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned (e.g., for establishing UCHGs of the kind introduced above, as well as for the SMS itself) and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

Figure 1:
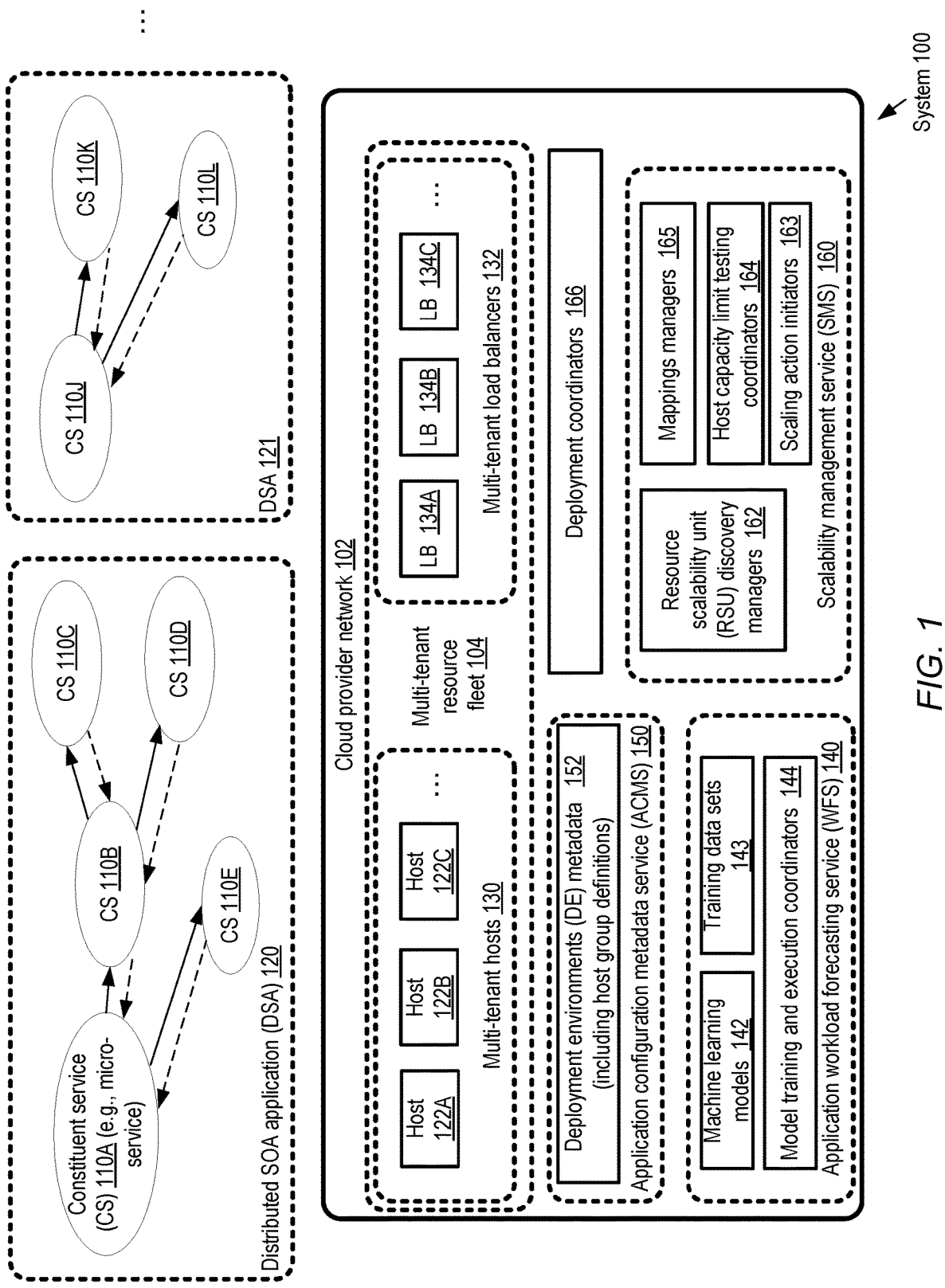
FIG. 1 illustrates an example system environment in which a scalability management service may be utilized for accurately scaling constituent services of service-oriented architecture (SOA) applications utilizing multi-tenant resources, according to at least some embodiments.

FIG. 1 illustrates an example system environment in which a scalability management service may be utilized for accurately scaling constituent services of service-oriented architecture (SOA) applications utilizing multi-tenant resources, according to at least some embodiments. As shown, system 100 comprises artifacts and resources of several network-accessible services implemented at a cloud provider network 102, including an SMS 160 and an application workload forecasting service (WFS) 140. In the embodiment shown in FIG. 1, a number of distributed SOA applications such as DSAs 120 and 121 may be implemented on behalf of clients of the SMS using various resources of the cloud provider network. A given DSA may be represented as a graph of lower-level services referred to as constituent services or micro-services. For example, DSA 120 comprises CSs 110A, 110B, 110C, 110D and 110E, while DSA 121 comprises CS 110J, CS 110K and CS 110L. To implement the business logic of a given DSA for a particular transaction or end-user request, the CSs of a given DSA may send inter-CS service requests to one another, e.g., by invoking programmatic interfaces such as APIs implemented by the DSAs, and receive corresponding responses. Respective Domain Name System (DNS) names may be assigned to individual CSs, and used to direct service requests to the CSs in the depicted embodiment (e.g., via load balancers as discussed below). Service requests sent between CSs of DSAs 120 and 121 are shown by full arrows (arrows that are not represented using dashed lines) in FIG. 1, while corresponding responses are shown by dashed arrows. For example, in DSA 120, CS 110A may send service requests to CS 110B and CS 110E and receive corresponding responses, while CS 110B may send requests to CS 110C and CS 110D and receive corresponding responses. In DSA 121, CS 110J may send requests to CS 110K and CS 110L and receive corresponding responses. While DSAs with only a few CSs are shown in FIG. 1, in practice a given DSA (e.g., a DSA for managing financial website transactions or retail website transactions) may sometimes comprise hundreds or thousands of CSs.

In the embodiment shown in FIG. 1. CSs of a given DSA may be deployed at one or more deployment environments (DE), with each such DE in turn comprises some number of multi-tenant resources of the cloud provider network 102 which are utilized to process service requests from a respective set of request sources. The request sources of a given CS in a given DE may, for example, include end users of the parent DSA, other CSs of the parent DSA, load testing devices, and the like. In some cases, multiple DEs may be set up for a given CS to handle workloads generated by DSA end users in respective geographic regions. Respective DEs may also be set up for a given CS in different stages of a DSA development and testing pipeline in some embodiments.

The provider network's multi-tenant resource fleet 104 may comprise numerous multi-tenant hosts 130 (e.g., hosts 122A, hosts 122B and 122C) and multi-tenant load balancers 132 (such as LBs 134A, 134B and 134C) in some embodiments. The hosts used in a given DE may be classified into uniform-configuration host groups (UCHGs) in various embodiments as discussed below in further detail, e.g., to simplify administration, such that the hosts that are placed in a given UCHG have a common set of configuration properties/settings. A given load balancer such as LB 134A may be configured to distribute service requests among some set of hosts of one or more UCHGs in a given DE using a selected load balancing algorithm such as a round-robin algorithm, an LRU (least recently use) algorithm or the like. In some embodiments, the multi-tenant resource fleet 104 may include other types of resources that can be used for DSAs, such as storage servers, database servers and the like. A given multi-tenant resource may in general be employed for one or more CSs in one or more DEs at a given point in time in the depicted embodiment, although at some points in time, it may be the case that a given multi-tenant resource is only being used for one CS in one DE.

To simplify the presentation, LBs 134 are all assumed herein to distribute service requests directed to them (e.g., using respective DNS names for one or more CSs) uniformly among the set of hosts for which the LBs are assigned. In some embodiments in which compute instances of a virtualized computing service (VCS) of the provider network are used to implement LBs, a respective virtual network interface (VNI) may be assigned to each LB. A VNI is a logical construct comprising a group of networking properties (including, for example, private Internet Protocol (IP) addresses accessible within isolated virtual networks of the VCS) which can be easily transferred programmatically from one compute instance to another without requiring re-configuration of the underlying physical network interfaces used at the hosts at which the compute instances are run.

An owner or administrator of a CS of a DSA, referred to as a service owner herein, may submit a programmatic request, e.g., to a deployment coordinator 166 of the provider network in some embodiments, requesting the initial deployment of a given CS to a DE comprising specified multi-tenant resources of fleet 104 in the depicted embodiment. In response, executable code of the CS may be deployed to the set of hosts of the DE (arranged in one or more UCHGs), and the set of load balancers selected by the service owner may be configured to distribute service requests from some set of request sources among the hosts. A given CS may be deployed at multiple DEs concurrently in the depicted embodiment. In some embodiments, deployment coordinators may be implemented as part of the SMS.

An application configuration metadata service (ACMS) 150 may store DE metadata 152 in the depicted embodiment, such as the set of DEs to which a given CS of a given DSA is currently deployed, definitions or membership information about UCHGs, the specific set of UCHGs and hosts currently in use at each DE, the set of LBs configured to distributed service requests to a particular UCHG's hosts or multiple UCHGs, and so on. The ACMS 150 may implement a set of programmatic interfaces which can be used to submit queries about the DEs at which various CSs of various DSAs are deployed in some embodiments. In at least one embodiment, the ACMS may enable subscriptions to DE configuration change information, so that for example SMS components may by automatically notified when the configuration of a DE is changed by adding/removing hosts or LBs.

In various embodiments, the SMS may receive a request to automate the scaling of a given CS (which has already been deployed) at a given DE if and when the workload of the CS at the DE is forecast to change, e.g., as a result of DSA-level workload forecasts provided by the WFS. The DE whose scaling is to be automated may be referred to as the target DE, and the CS running at that DE may be referred to as the target CS herein. The request may be received at the SMS from the service owner of the target CS in some embodiments via a programmatic interface (such as a set of APIs, a web-based console, a command-line tool, or a graphical user interface). Such requests may be referred to as requests to onboard the target CS and its target DE for automated scaling in some embodiments. The request for automated scaling may simply indicate an identifier of the target DE and the target CS in some embodiments, and details about the hosts and load balancers currently in use for the target DE may not be specified.

In response to receipt at the SMS of the scalability automation request for a target DE, a resource scalability unit (RSU) discovery manager 162 of the SMS may collect or obtain a scalability assessment data set in the depicted embodiment, e.g., by submitting one or more queries to the ACMS 150. The scalability assessment data set may indicate, for example, the collection of LBs that have been configured to distribute service requests of one or more CSs (including the target CS for which scalability is to be automated) among multi-tenant hosts of at least one UCHG being used for the target CS at the target DE and (b) the collection of DEs whose service requests are distributed at least in part by one or more LBs of that collection of LBs.

Based at least in part on analysis of the scalability assessment data set, one or more RSUs associated with the target DE may be identified in the depicted embodiment. In various embodiments, a particular RSU may indicate a set of UCHGs, a set of DEs (including the target DE) and a set of LBs which should be dealt with as a logical unit when initiating scalability actions (such as adding hosts to handle forecast increases in workload). The RSU may be defined such that individual hosts in its set of UCHGs are expected to have the same workload level of service requests as other hosts of the set of UCHGs. The workload of service requests of an individual host of the set of UCHGs may be transmitted to the host by each LB of the set of LBs indicated in the RSU, and that workload of service requests may be received from service request sources of each DE of the set of DEs indicated in the RSU. Each UCHG to which of the target CS is deployed in the target DE may be indicated in at least one RSU of the one or more RSUs identified for the target DE.

In response to obtaining a forecast of a change in workload level of the DSA to which the target CS belongs, a determination may be made, e.g., by a scaling action initiator 163 of the SMS, a particular number of hosts which are to be added to a particular UCHG indicated in an RSU identified for the target DE in response to a change in workload level forecast for the parent DSA of the target CS in the depicted embodiment. In order to determine the number of hosts to be added, a mapping between the workload of the DSA and the corresponding workload expected at the target CS may be used in various embodiments, as well as the definitions of the RSUs which have been identified. Such mappings between DSA-level workloads, CS-level workloads, and host-level workloads may be stored at (and in some cases computed by) one or more mappings managers 165 of the SMS in some embodiments. For example, the forecast for workload changes at the DSA level may indicate the number of additional transaction requests of a particular type (e.g., buy orders for an inventory item, in the case of a DSA being used to manager web site of a retailer) that are expected during a future time interval. Each such additional transaction request may lead to N API invocations of the target CS, and each such API invocation may lead to X % increase in utilization of a host of a UCHG. The mappings maintained by the mappings managers 165 may store information about the quantitative relationships between the different level of workloads and requests in the depicted embodiment.

In some embodiments, after the set of RSUs is identified for the target DU, the service owner of the target CS (or service owners of all the CSs for which the target DE is being used) may be notified about (e.g., presented with the definitions of) the RSUs via a programmatic interface, and the service owners may be asked to provide the mapping information. In other embodiments, at least some of the mappings may be computed by the mappings managers 165, e.g., based on analysis of log records indicating DSA transaction requests, corresponding API calls to the CSs, and records of resource utilization at the hosts. In at least one embodiment, a formula for computing the number of hosts to be added to the UCHGS indicated in an RSU may be generated at the SMS, and a service owner may be asked to approve the formula via a programmatic interface. In one embodiment, the service owner may provide the formula via a programmatic interface.

In some embodiments, stress tests may be conducted by host capacity limit testing coordinators 164 of the SMS, to determine the maximum rate at which hosts of a given UCHG can process service requests of a particular type directed to the hosts. Results of such stress tests, which may indicate the capacity limit of the hosts, may also be employed when determining the number of hosts to add to a DE to respond to forecast increases in workload.

Forecast changes in DSA workloads may be obtained at the SMS from the WFS in the depicted embodiment. The WFS 140 may include model training and execution coordinators 144 for a variety of machine learning models 142. The models may be trained, for example, in response to programmatic requests from SMS clients, using training data sets 143 that include timestamped records of application client requests directed to the DSAs. After the forecast workload change of the parent DSA of a target CS at a target DE is received at the SMS, and the number of hosts to be added to an UCHG of the DE is determined using the RSUs identified for the DE as described above, in various embodiments a scaling action initiator 163 may cause that number of hosts to that UCHG, and the code of the target CS to be deployed at the added hosts. In some embodiments, the SMS may automatically determine the number of hosts (and/or other resources such as load balancers) to be added to UCHGs of other CSs of the DSA, e.g., based on mappings between respective workload levels of each CS of the DSA. For example, the count of additional service requests that may be sent to a given CS (such as CS 110D of DSA 120) as a function of the number of requests that are sent to another CS (such as CS 110B) of the same DSA may be determined using the service graph of the DSA and logs of inter-CS requests, and such information may be used to automatically scale multiple CSs deployed to respective DEs by adding the appropriate number of hosts to each DE.

In at least some embodiments, mappings between workload levels of LBs and the corresponding workload levels of the CSs/DEs at which the LBs are configured may be used by the SMS to determine whether additional LBs (e.g., along with additional hosts) should be assigned to a target DE. For example, a given LB may be able to distribute at most N service requests per second to a set of K hosts, so if the forecast increase in workload of the target DE is such that the number of service requests that have to be load balanced increases beyond N per currently-configured LB, then additional LBs may be acquired and assigned for the target DE. As mentioned above, in addition to hosts and load balancers, the counts of other resource such as database instances, storage devices and the like may also be modified in some cases by the SMS to handle forecast increases in workloads, and/or configuration settings such as rate limits or thread count limits may be changed. Mappings between workload levels of resources such as the database instances, storage devices and the like, and the corresponding workload levels of the CSs/DEs may be used in various embodiments to determine the modifications to be made at the resources and configuration settings. In some embodiments, the SMS may obtain snapshots of past resource deployments of an SOA application during time intervals of interest, and use those snapshots to fine tune or modify the formulas used for estimating the number of resources to be added. For example, in a scenario in which the SOA application is used to handle product purchase requests directed to a retail web site, a snapshot of the resource deployment during a peak purchasing period (such as a short-duration sale associated with a holiday season) may be obtained and used to modify the formulas.

Figure 2:
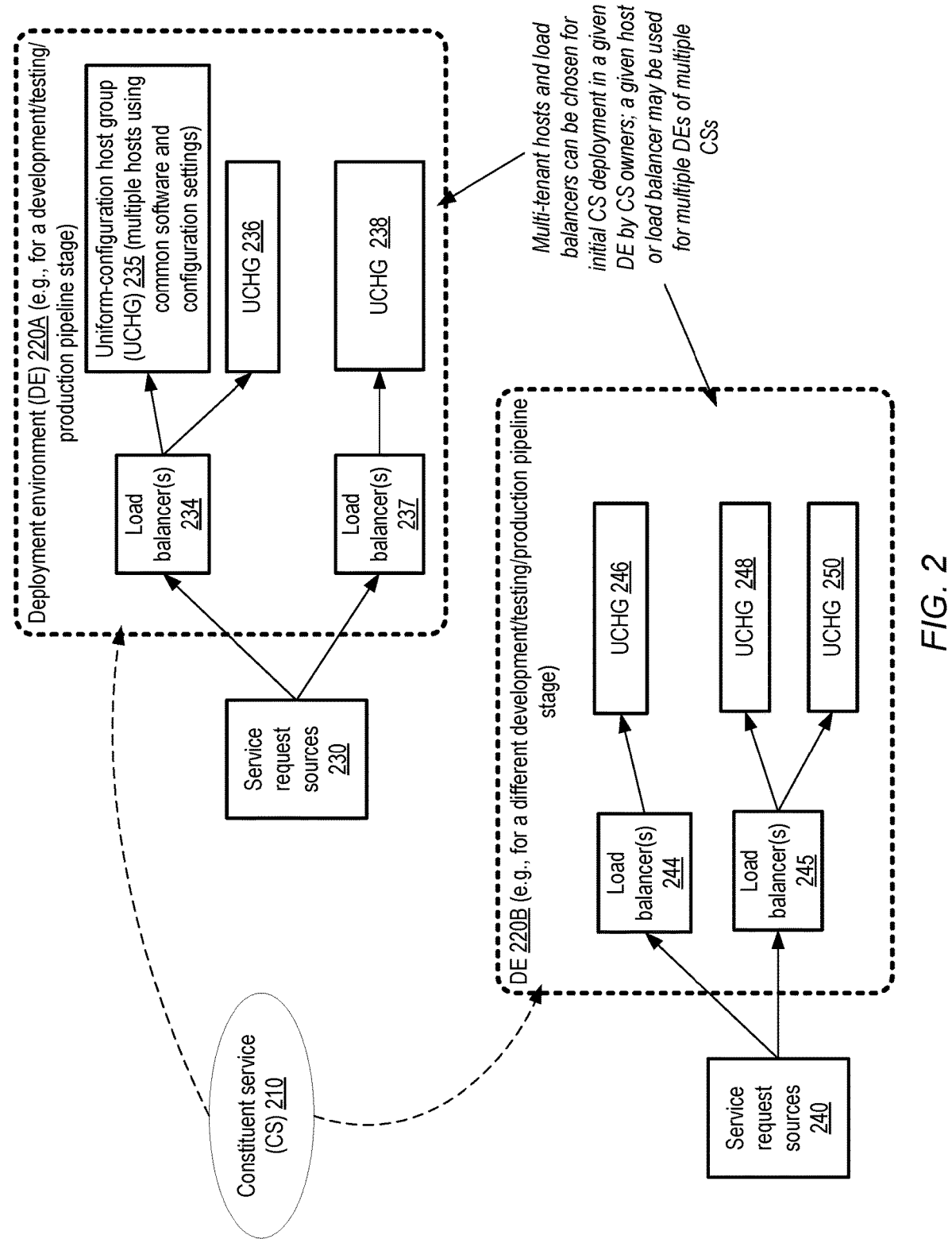
FIG. 2 illustrates an example scenario in which a constituent service of an SOA application may be executed concurrently in multiple deployment environments, according to at least some embodiments.

FIG. 2 illustrates an example scenario in which a constituent service of an SOA application may be executed concurrently in multiple deployment environments, according to at least some embodiments. The executable code of a constituent service (CS) 210 of an SOA application is deployed at the hosts of several UCHGs of at least a pair of deployment environments (DEs), including DE 220A and DE 220B. DEs 220A and 220B may be used for respective stages of a development/testing/production pipeline stage of the SOA pipeline in the depicted embodiment.

DE 220A may comprise UCHGs 235, 236 and 238. Each UCHG may include multiple hosts using a common set of software programs (e.g., executable code of the same set of programs may be run at each host of the UCHG) and a common set of configuration settings in the depicted embodiment. Load balancers 234 may be configured to distribute service requests among the hosts of UCHGs 235 and 236, and a different set of load balancers 237 may be set up to distribute service requests among hosts of UCHG 238. Service requests of one or more categories, which can be executed using the code of CS 210, may be directed from service request sources 230 to the load balancers of DE 220A, and distributed by those load balancers among the hosts of DE 20A's UCHGs.

DE 220B may comprise UCHGs 246, 248 and 250. Load balancers 244 may be configured to distribute service requests among the hosts of UCHG 246, and load balancers 245 may distribute service requests among hosts of UCHGs 248 and 250. Service requests from a set of service request sources 240 may be directed to the load balancers of DE 220B and distributed by those load balancers among the hosts of DE 220B's UCHGs.

In various embodiments, multi-tenant hosts and load balancers may be selected for initial CS deployment in various DEs by the service owners of the CSs. A given host or load balancer may be used for multiple DEs of multiple CSs, or even for multiple DEs of a given CS in the depicted embodiment.

Figure 3:
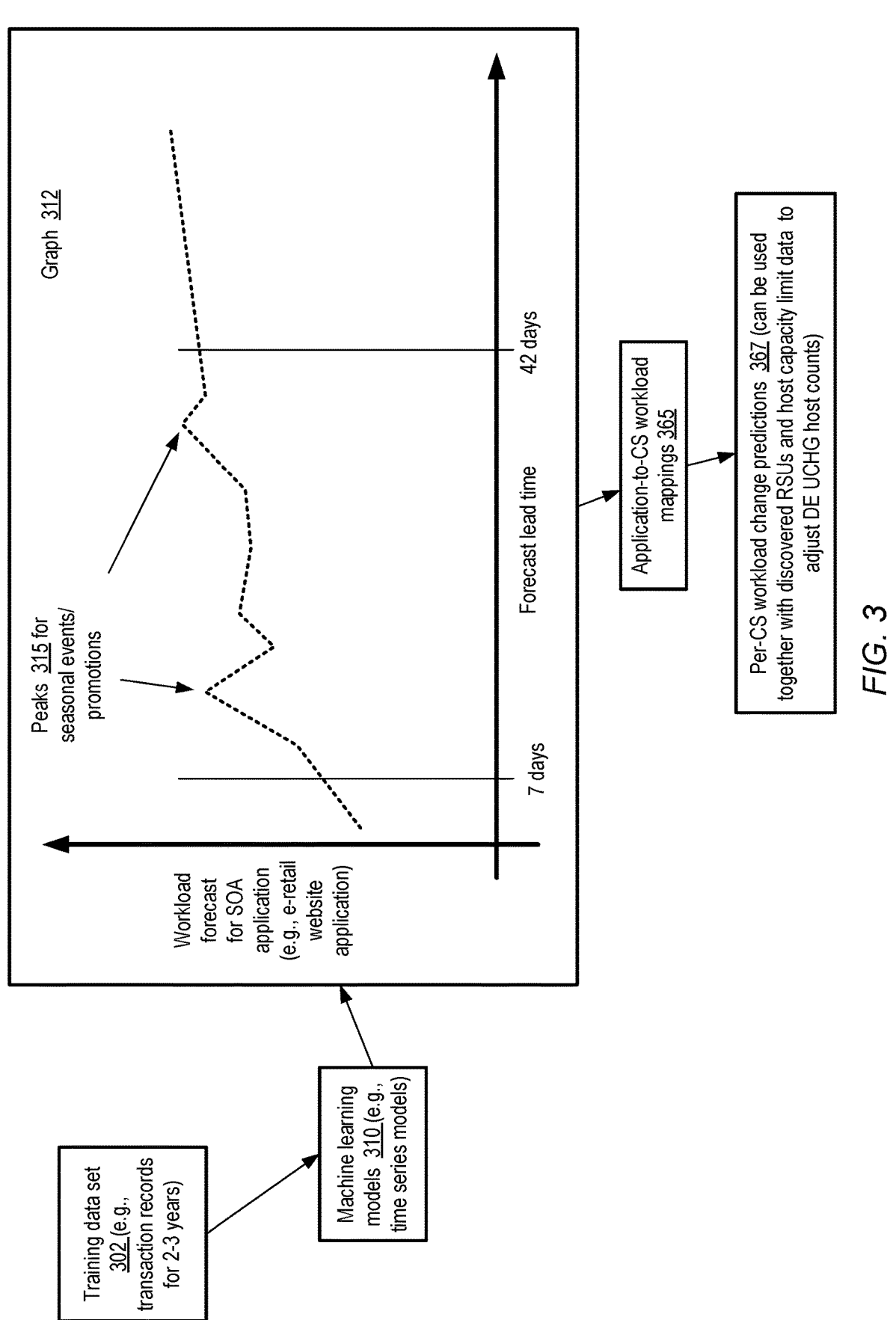
FIG. 3 illustrates an example workflow in which forecast changes in workloads of SOA applications may be used together with resource scaling units identified for the constituent services of the SOA applications to initiate scaling actions for the constituent services, according to at least some embodiments.

FIG. 3 illustrates an example workflow in which forecast changes in workloads of SOA applications may be used together with resource scaling units identified for the constituent services of the SOA applications to initiate scaling actions for the constituent services, according to at least some embodiments. A training data set 302 comprising transaction records associated with requests submitted by clients of the SOA application may be used to train one or more machine learning models 310 to forecast changes in the application-level workload in the depicted embodiment. The models may be trained, for example, in response to programmatic requests submitted by SOA application owners and/or service owners of the CSs of the SOA applications in various embodiments. Any of a variety of models may be trained, such as time series models, neural network based models, and the like in different embodiments. The training records included in the training data sets may, for example, comprise timestamped records of application requests generated during relatively long recent time intervals such as several months or years. The effects of seasonal events such as holidays and the like may be captured in the training data, along with overall trends over time.

The machine learning models 310 may be used to generate forecast workload graphs such as graph 312 in the depicted embodiment. The Y-axis of such a graph may represent the workload forecast for the SOA application, such as the number of orders for items of one or more categories which are expected to be received at an e-retail website application from end users or customers per hour or per day. The X-axis may represent the forecast lead time, e.g., expressed in days from the time at which the forecast is generated. The forecast may, for example, be generated for lead times of 7 days, 42 days, etc. in the future from the date at which the forecast is estimated. The curve indicating the forecast workload may show temporary peaks 315 corresponding to (for example) seasonal events, sales or promotions, as well as overall trends such as the kind of gradual increase shown in graph 312.

Using application-to-CS workload mappings 365 (generated and/or managed by mappings managers of an SMS) per-CS workload change predictions 367 may be generated from the SOA application workload forecasts at an SMS in the depicted embodiment. Such per-CS workload change predictions may then be used together with discovered RSUs and host capacity limit data (obtained using stress tests of the kind mentioned above) to adjust DE UCHG host counts in various embodiments.

FIG. 4 illustrates examples of uniform-configuration host groups into which the resources used for constituent services of an SOA application may be classified, according to at least some embodiments. The hosts of a multi-tenant host fleet used for SOA applications may be classified into such host groups for a variety of reasons, such as ease of administration, separation of hosts that are intended for different types of tasks, and so on. Some UCHGs may be set up for compute intensive tasks of CSs, others for storage or memory intensive tasks, and so on.

In the embodiment shown in FIG. 4, each UCHG may be assigned a respective identifier. For example, UCHG 410A may be assigned identifier UCHG-ID 415A, UCHG 410B may be assigned identifier UCHG-ID 415B and UCHG 410C may be assigned identifier UCHG-ID 415C. Hosts within a given UCHG may share configuration properties, such as the hardware and software stacks as well as tunable parameters (such as networking parameters, process and thread limits, etc.) For example, the common configuration 425A of each host included in UCHG 410A may comprise a hardware stack 420A comprising N CPUs of a particular type, M1 GB of memory, D1 TB of disk space, and a network interface card with a bandwidth capacity of P1 GB/sec. The host software stack 421A of each host in UCHG 410A may include some set of hypervisors, virtual machines of one or more types (e.g., with each virtual machine of a given type launched using the same machine image), software containers, executable code of one or more CSs, and so on. The values of various tunable/modifiable parameters 422A may be kept the same across all the hosts of UCHG 410A. Similarly, the common configuration 425B of each host included in UCHG 410B may comprise a hardware stack 420B comprising N/2 CPUs, M1*4 GB of memory, D1/2 TB of disk space, and a network interface card with a bandwidth capacity of P1 GB/sec. The host software stack 421B of each host in UCHG 410B may include a different combination of hypervisors, virtual machine types, software containers, executable code of a different set of CSs, and so on. The values of various tunable/modifiable parameters 422B may be kept the same across all the hosts of UCHG 410B. The common configuration 425C of each host included in UCHG 410C may comprise the same hardware stack 420A as is used for UCHG 410A hosts and the same host software stack 421A as is used for UCHG 410A hosts, but the values of some tunable/modifiable parameters 422C may differ from the values of corresponding parameters used in UCHG 410A. At a given point in time, the number of hosts configured within each UCHG of the three UCHGs shown in FIG. 4 may be indicated by current host counts 427A, 427B and 427C respectively. The host counts may be increased and/or decreased dynamically to respond to forecast changes in workload, e.g., using RSUs of the kind introduced above.

FIG. 5 illustrates examples of resource scaling units which may be identified for constituent services of an SOA application by a scalability management service based on analysis of multi-tenant use of resources, according to at least some embodiments. Four examples of RSUs are shown in FIG. 5. In example 501, the scalability assessment data set (SADS) 520A obtained at an SMS (e.g., in response to a request to automate scaling of a deployment environment DE-1) indicates that UCHGs U1, U2 and U3 used within DE-1 all receive service requests distributed via a single load balancer LB1, that those UCHGs receive service requests only from LB1, and hosts of those UCHGs are not used for any other DE. In this type of scenario, an RSU RSU1 defined for DE-1 may include UCHGs U1 U2 and U3 as members, and may also indicate LB1 as the load balancer associated with RSU1. All the hosts of all three UCHGs are expected to receive the same level of workload, and hence can be scaled together based on a common workload forecast at the DE level. This type of scenario, in which hosts are not shared across DEs and the same set of LBs is used for all the hosts being used in the target DE, may be referred to as a SINGLE_MAP scenario for RSU discovery.

In example 502, SADS 520B obtained at an SMS, e.g., in response to a request to automate scaling of a DE DE-2, may indicate that UCHGs U4 and U5 receive DE-2 service requests distributed via a load balancer LB2, while UCHGs U6 and U7 receive DE-2 service requests distributed via a load balancer LB3. The forecast workloads of the two LBs LB2 and LB3 may not be identical; for example, the two LBs may have been set up to receive service requests from different subsets of DE-2's service request sources. Accordingly, two RSUs may be identified for DE-2: RSU2 comprising UCHGs U4 and U5, and RSU3 comprising UCHGs U6 and U7. Respective formulas for translating the overall SOA application workload to the workloads distributed by the two LBs LB2 and LB3 may be obtained (and approved by the service owner of the CS deployed to DE-2) in example 502. Scenarios of the kind shown in example 502 may be referred to as SPLIT_MAP scenarios for RSU discovery.

In example 503, SADS 520C obtained at an SMS, e.g., in response to a request to automate scaling of DE-3 or DE-4, may indicate that UCHGs U8, U9 and U10 are configured to receive service requests of both DE-3 and DE-4. DE-3 service requests are distributed via a load balancer LB4, while DE-4 service requests are distributed via a load balancer LB5. Only a single RSU RSU4 may be needed in example 503, as the workloads of all three UCHGs may be identical even though service requests are being directed to them from two different load balancers. RSU4 may include all three UCHGs U8, U9 and U10, and indicate that both LBs LB4 and LB5 are associated with each of the three UCHGs. A formula which includes a combination (e.g., a linear combination) of forecast changes in workloads of DE-3 and DE-4 may be used to determine how many hosts need to be added to the three UCHGs U8, U9 and U10 in example 503. Scenarios of the kind shown in example 503 may be referred to as MULTI_MAP scenarios for RSU discovery.

In example 504, SADS 520D obtained at an SMS, e.g., in response to a request to automate scaling of DE-5, DE-6 or DE-7, may indicate that UCHGs U11, U12 are configured to receive service requests of DE-5 via a load balancer LB6, UCHGs U12 and U13 are configured to receive service requests of DE-6 via a load balancer LB7, and UCHGs U13 and U11 are configured to receive service requests of DE-7 via a load balancer LB8. In such a scenario, three RSUs RSU5, RSU6 and RSU7 may be needed, each applicable to a pair of DEs. RSU5, applicable to DE-5 and DE-7, may include U11 and indicate that requests associated with RSU5 are distributed by two load balancers LB6 and LB8. RSU6, applicable to DE-5 and DE-6, may include U12 and indicate that requests associated with RSU6 are distributed by load balancers LB6 and LB7. RSU7, applicable to DE-6 and DE-7, may include U13 and indicate that requests associated with RSU67 are distributed by load balancers LB7 and LB8. Respective formulas which represent combinations of forecast changes in workloads of the three pairs of DEs may be used to determine how many hosts need to be added to the three UCHGs in example 504. Scenarios of the kind shown in example 504 may be referred to as HYBRID_MAP scenarios for RSU discovery. Other types of RSUs than the types shown in FIG. 5 may be identified at an SMS in some embodiments.

Figure 6:
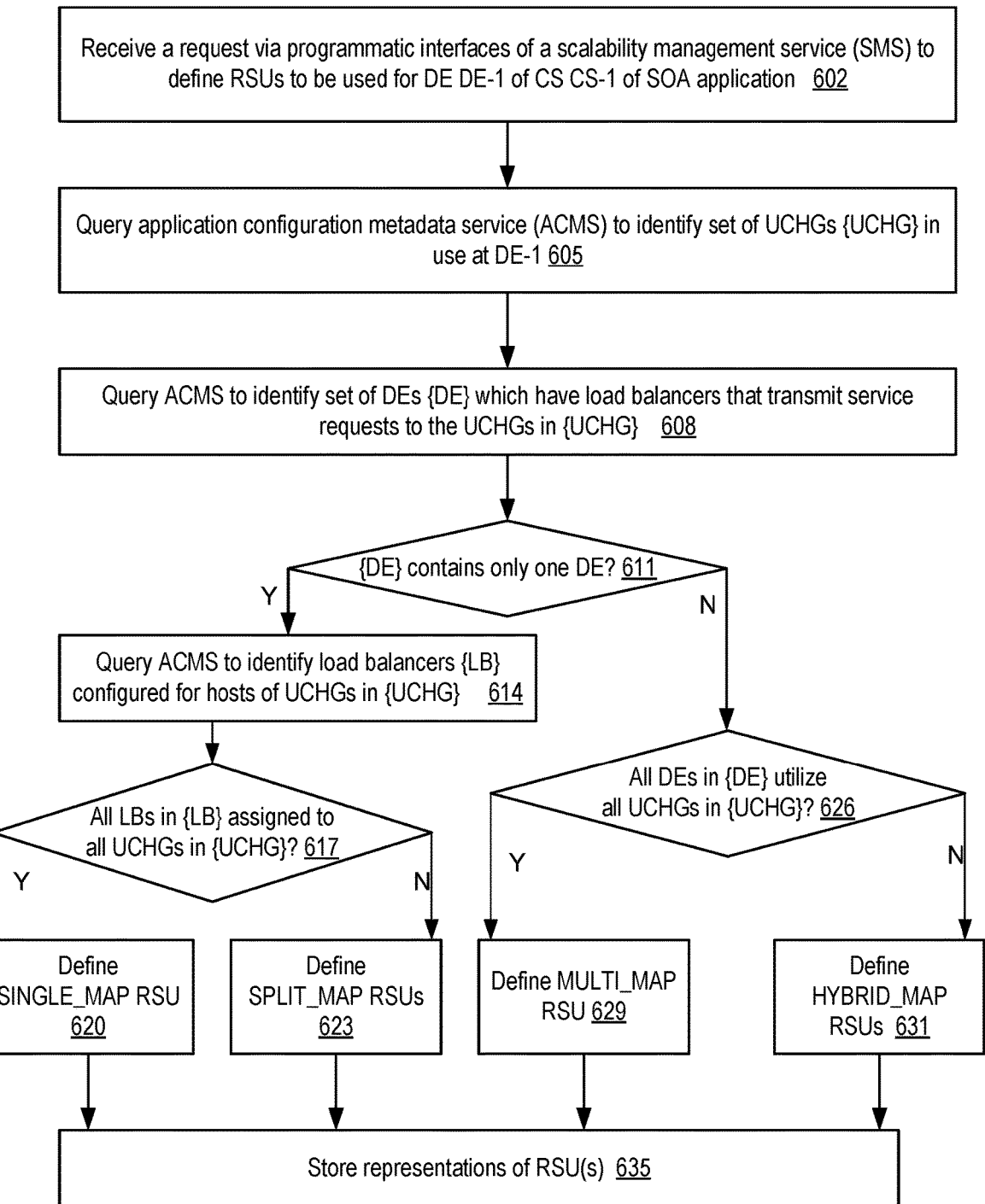

FIG. 6 is a flow diagram illustrating aspects of operations that may be performed to identify resource scaling units for constituent services of an SOA application implemented using multi-tenant resources, according to at least some embodiments. As shown in element 602, a request to discover or define RSUs applicable to at least a particular DE DE-1 of a constituent service CS-1 of an SOA application may be received, e.g., via a programmatic interface at an SMS similar in features and functionality to SMS 160 of FIG. 1. An identifier of the DE may be included in the request in various embodiments, but details about the current set of hosts, UCHGs, or load balancers being used may not be provided. The request may be referred to as a scalability analysis request in some embodiments.

Metadata that can be used to identify the RSU(s) may be obtained at the SMS, e.g., from an application configuration metadata service (ACMS) similar to ACMS 150 of FIG. 1 in the depicted embodiment. First, for example, a query may be directed to the ACMS to identify the set of UCHGs {UCHG} (in FIG. 6, curly brackets are used to denote sets of the items indicated within the curly brackets) which are in used at DE-1, as indicated in element 605. Then, the set of DEs {DE} which have associated load balancers configured to transmit service requests to the UCHGs in {UCHG} may be identified, e.g., using another query directed to the ACMS (element 608).

The number of DEs included in {DE} may be determined. If {DE} contains only one DE, as determined in element 611, a query may be directed to the ACMS to identify the set of load balancers {LB} configured for the various hosts of UCHGs within {UCHG} (element 614). If all the LBs in {LB} are assigned to all the UCHGs in {UCHG}, as determined in element 617, a SINGLE_MAP scenario (similar to the scenario discussed with respect to example 501 of FIG. 5) may be detected, and the corresponding RSU may be identified or defined (element 620). If, in operations corresponding to element 617, it is determined that there are different load balancers assigned to some of the UCHGs in {UCHG} than are assigned to other UCHGs in {UCHG}, a SPLIT_MAP scenario similar to that of example 502 of FIG. 5 may be detected, and the corresponding RSUs may be defined (element 623) in the depicted embodiment.

If, in operations corresponding to element 611, a determination is made the {DE} contains more than one DE, a determination may be made as to whether all the DEs in {DE} utilize all the UCHGs in {UCHG} (element 626). If all the DEs in {DE} do use all the UCHGs in {UCHG}, a MULTI_MAP scenario similar to example 503 of FIG. 5 may be recognized, and the corresponding RSU may be defined (element 629). Otherwise, if some DEs in {DE} use a different set of UCHGs than others, a HYBRID_MAP scenario may be detected, and the corresponding RSUs may be defined (element 631) in the depicted embodiment. After the RSU(s) are identified (in operations corresponding to elements 620, 623, 629 or 631), representations of the RSU(s) may be stored in a metadata repository of the SMS in some embodiments (element 635). The representations may, for example, be expressed in a language such as JSON (JavaScript Object Notation) or XML (Extensible Markup Language) in different embodiments.

FIG. 7 is a flow diagram illustrating aspects of operations that may be performed to automate scaling of SOA applications in response to requests from constituent service owners, according to at least some embodiments. As shown in element 702, executable code of a CS CS-1 of an SOA application App1 may be deployed at a deployment DE-1, e.g., in response to receiving a deployment request from a service owner of CS-1. DE-1 may include some number of multi-tenant hosts (MTHs), organized into one or more UCHGs of the kind introduce earlier, to which CS-1 service requests may be distributed by number of multi-tenant load balancers (MTLBs) or front-end request handlers. In some cases, the code of CS-1 may also be deployed to other DEs, code of other CSs may be deployed to some of the MTHs used for DE-1, and/or service requests of other CSs/DEs may also be distributed via MTLBs used for DE-1.

At a scalability management service (SMS) similar in features and functionality to SMS 160 of FIG. 1, a request to automate scaling of CS-1 at DE-1 may be received (element 705), e.g., from the CS-1 service owner or some other authorize entity in the depicted embodiment. The request, which may also be referred to as a request to perform scalability analysis of DE-1, may indicate an identifier of DE-1 in various embodiments, but may not include details of the current set of resources being used for DE-1. In some embodiments, the SMS may be implemented using resources of a cloud provider network. In at least one embodiments, the MTHs and MTLBs may be implemented using resources of the cloud provider network. In one embodiment, an application deployment coordinator, implemented at a cloud provider network, may be used for at least the initial deployment of CS-1 at DE-1.

The SMS may determine a scalability assessment data set (SADS) to be used to respond to the request to automate scaling in various embodiments (element 708). The SADS may for example indicate the set of MTLBs used to distribute service requests (of one or more CSs) among hosts of at least one UCHG used in DE-1, as well as the set of DEs whose service requests are distributed by MTLBs of that set of MTLBs. The SADS may be obtained, in some embodiments, by sending queries from the SMS to an application configuration metadata service (ACMS) similar in functionality of ACMS 150 of FIG. 1.

Based at least in part on analysis of the SADS, the SMS may identify one or more RSUs to be used to perform scaling actions (e.g., adding MTHs) with respect to one or more UCHGs of DE-1 in the depicted embodiment (element 711). A given RSU may indicate a set of MTHs, such that each host of that set of MTHs is expected to receive a workload level equal to that of every other host in that set of MTHs, from a particular set of MTLBs set up for one or more DEs including DE-1. In scenarios in which multiple RSUs are identified, the workload of an MTH within the UCHGs of one of the RSUs may not be expected to receive workload equal to the workload of an MTH within the UCHGs of the other RSUs in at least one embodiment. In some embodiments, information about the identified RSUs may be presented via programmatic interfaces to the service owners that requested the automated scaling. In one embodiment, a service owner may submit a programmatic request to view the RSUs applicable to a specified DE such as DE-1, and may not necessarily want the SMS to take automated scaling actions until after the RSUs have been approved. After the RSUs have been identified and/or approved, the RSU definitions may be stored in a repository of metadata maintained by the SMS in some embodiments.

A mapping between the workload level (e.g., the rate of end user requests of various kinds) of App1 and the workload level of CS-1 in DE-1 (e.g., the rate of CS-1 API invocations used to fulfill the end user requests) may be obtained at the SMS in various embodiments (element 714). Such a mapping may be required, for example, in embodiments in which high-level forecasts for App1 workload changes may be available via machine learning models, but models for CS-level workload forecasts may not be available. In some embodiments, after the RSUs for a given DE or set of DEs have been identified, the service owners of the CSs deployed at those DEs may provide such mappings. In one embodiment, the mapping may be generated by the SMS automatically, e.g., based on analysis of log records of end-user transaction requests directed to App1 and log records indicating the corresponding operations performed at MTHs of DE-1.

For a given forecast increase in App1 workload, the actual number of MTHs that are to be added to the UCHGs indicated in the RSUs to process the corresponding increases in CS-1 workload levels at DE-1 may be computed/determined at the SMS in the depicted embodiment (element 717). The number of MTHs may be computed, for example, using the RSU definitions that were identified, the mapping between App1 workload and DE-1 workload, and a service request handling capacity limit of individual MTHs of the UCHGs of the RSUs. Such capacity limits may be obtained by the SMS by running stress tests in some embodiments. In at least one embodiment, a formula for expressing the workload level changes (and corresponding number of MTHs that may need to be added to process the workload changes) of UCHGs indicated in an RSU as a function of App1 workload level changes may be identified by the SMS and presented via a programmatic interface to a service owner of CS-1, and approval of the formula may be obtained from the service-owner by the SMS. In some embodiments, such formulas may be provided via programmatically by the service owner.

The SMS may cause the determined number of MTHs to be added to the UCHGs of DE-1 automatically by the SMS (element 720) in various embodiments. In some embodiments the App1 workload forecasts may be available several days or weeks in advance, so the additional resources may be deployed before the workload changes actually occur, thereby ensuring that App1 end user experience remains acceptable even if the workload changes substantially.

In some embodiments, the set of multi-tenant resources being used for one or more DEs may be changed dynamically by entities other than the SMS, e.g., based on decisions made by data center administrators, detected failures/errors, determining that a given DE is no longer needed, and so on. The RSUs that were identified based on the current set of resources and deployments at some point in the past may not necessarily remain valid or applicable after such configuration changes are made, and therefore may have to be reconsidered. FIG. 8 is a flow diagram illustrating aspects of operations that may be performed to automatically re-evaluate resource scaling units for constituent services of an SOA application on an ongoing basis, according to at least some embodiments. As shown in element 802, a request may be received via a programmatic interface at an SMS similar to SMS 160 of FIG. 1 to automatically re-evaluate RSUs associated with a deployment environment DE-1 on an ongoing basis. The set of resources being used for CS-1 of an SOA application App1 at DE-1 may for example change to resource failures/errors, service-owner initiated reconfigurations, etc., and the manner in which multi-tenant resources are being shared between CS-1 and other CSs deployed at one or more DEs other than DE1 may sometimes change due to configuration changes of the other CSs/DEs. Host capacity limits estimated using stress tests of the kind indicated above may sometimes end up being different from the actual capacity limits of the hosts when the hosts are subjected to real-world workloads. Such differences between estimated capacity and actual capacity may sometimes require changes in deployment environment configurations, and such changes in deployment environment configurations may in turn require re-evaluation of RSUs.

An ACMS which stores up-to-date configuration details regarding various DEs may implement a subscription inter-face in some embodiments for entities that wish to be notified when certain types of configuration changes occur. The SMS may communicate with such an ACMS to subscribe to automated notifications of configuration changes pertaining to the DE-1 resources in the embodiment shown in FIG. 8 (element 805).

After the subscription request from the SMS is accepted, the SMS may be notified of configuration changes with respect to DE-1 resources, including (for example) changes in configurations of other CSs and other DEs which share multi-tenant resources with DE-1 (element 808). In some embodiments, such notifications may be provided to the SMS as soon as the corresponding configuration changes occur; in other embodiments, the SMS may be notified periodically (e.g., once every day or once every hour) regarding any relevant configuration changes that have occurred since the last notification. The latter approach may be referred to as a batch notification approach, while the former approach may be referred to as real-time notification.

In response to such a notification, the SMS may re-evaluate RSUs pertaining to DE-1, e.g., using the most current version of configuration data available as its scalability assessment data set (element 811). If the RSU definitions change, the list of RSUs identified and stored for DE-1 may be updated accordingly. The most recent version of RSUs may be used to adjust the resources being used within DE-1 in various embodiments to handle forecast changes in App1 workload levels, using workload mappings and/or formulas of the kind discussed above (element 814). If/when the SMS is notified of additional changes that could affect RSU definitions, operations corresponding to elements 808-814 may be repeated in various embodiments.

It is noted that in various embodiments, some of the operations shown in the flow diagrams of FIG. 6, FIG. 7 and/or FIG. 8 may be implemented in a different order than that shown in the figure, or may be performed in parallel rather than sequentially. Additionally, some of the operations shown in FIG. 6, FIG. 7 and/or FIG. 8 may not be required in one or more implementations.

As discussed earlier, in some embodiments an SMS may be implemented at a provider network or cloud computing environment; provider network resources may also be used as load balancers and hosts used for SOA applications. A provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Deployment environments of a given SOA application may be spread among multiple data centers, availability zones or regions in some embodiments. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, an SMS may be implemented at least in part using an edge location of the provider network instead of or in addition to regional data centers. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as provider network extension sites or local zones (due to being more local or proximate to a group of users than traditional availability zones). A local zone may be connected in various ways to a publicly accessible network such as the Internet, for example directly, via another network, or via a private connection to a region. In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network.

A virtualized computing service (VCS) of the cloud provider network may offer virtual compute instances (also referred to as virtual machines, or simply "instances") with varying computational and/or memory resources in various embodiments, which may be used to implement SOA applications and/or the SMS. In one embodiment, each of the virtual compute instances may correspond to one of several instance types or families, and instances of any of several families may be employed for computations of an SOA application or SMS computations. An instance type may be characterized by its hardware type, computational resources (e.g., number, type, and configuration of central processing units [CPUs] or CPU cores, hardware accelerators for various tasks), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, a non-burstable or dedicated instance type that is allotted and guaranteed a fixed quantity of resources, or an instance type optimized for radio-based applications). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on.

The traffic and operations of the cloud provider network, and individual services such as the SMS, may broadly be subdivided into two categories in various embodiments: control plane operations and data plane operations. While the data plane represents the movement of data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information management). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In at least some embodiments, a server that implements the types of techniques described herein (e.g., various functions of an SMS and/or other services of a provider network as well as execution of constituent service code of an SOA application), may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC. ARM, or MIPS ISAs, or any other suitable ISA. In multi-processor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 8. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:

one or more computing devices comprising one or more processors and memory;

wherein the one or more computing devices include instructions that upon execution on or across the one or more computing devices:

deploy, at a first deployment environment, executable code of a first constituent service of a first application implementing a service oriented architecture, wherein the first application includes a plurality of interconnected constituent services, wherein the first deployment environment comprises multi-tenant resources selected from a shared fleet of multi-tenant resources available for constituent services of a plurality of applications, wherein the multi-tenant resources of the first deployment environment include a plurality of uniform-configuration host groups, wherein an individual uniform-configuration host group of the plurality of uniform-configuration host groups comprises multiple multi-tenant hosts with a common configuration, wherein executable code of the first constituent service is deployed at individual ones of the multi-tenant hosts of the plurality of uniform-configuration host groups, wherein executable code of the first constituent service is also deployed at a second deployment environment, wherein service requests for the first constituent service are directed to multi-tenant hosts of the first deployment environment from a first set of request sources, and wherein service requests for the first constituent service are directed to multi-tenant hosts of the second deployment environment from a second set of request sources;

receive, at a scalability management service, a request to automate scaling of the first constituent service at the first deployment environment in response to forecast changes in workload level of the first application, wherein the request includes an identifier of the first deployment environment, and wherein the request does not specify the plurality of uniform-configuration host groups;

determine, by the scalability management service, a scalability assessment data set indicating (a) a first collection of multi-tenant load balancers configured to distribute service requests of one or more constituent services among multi-tenant hosts of at least one uniform-configuration host group of the plurality of uniform-configuration host groups and (b) a first collection of deployment environments whose service requests are distributed at least in part by one or more load balancers of the first collection of multi-tenant load balancers;

identify, by the scalability management service, based at least in part on analysis of the scalability assessment data set, one or more resource scaling units, wherein a first resource scaling unit of the one or more resource scaling units indicates (a) a first set of uniform-configuration host groups, (b) a first set of deployment environments and (c) a first set of multi-tenant load balancers, such that individual multi-tenant hosts in the first set of uniform-configuration host groups of the plurality of uniform-configuration host groups the first constituent service is deployed to have the same workload level of service requests as other multi-tenant hosts of the first set of uniform-configuration host groups of the plurality of uniform-configuration host groups that the first constituent service is deployed to, wherein a workload of service requests of an individual multi-tenant host of the first set of uniform-configuration host groups is transmitted to the individual multi-tenant host by each multi-tenant load balancer of the first set of multi-tenant load balancers, wherein the workload of service requests of an individual multi-tenant host of the first set of uniform-configuration host groups is received from service request sources of each deployment environment of the first set of deployment environments, and wherein each uniform-configuration host group of the plurality of uniform-configuration host groups of the first deployment environment is indicated in at least one resource scaling unit of the one or more resource scaling units identified by the scalability management service;

in response to obtaining a forecast of a change in workload level of the first application, determine, by the scalability management service, using at least the first resource scaling unit, a particular number of multi-tenant hosts which are to be added to a particular uniform-configuration host group indicated in the first resource scaling unit in response to the change in workload level; and cause, by the scalability management service, (a) the particular number of multi-tenant hosts to be added to the particular uniform-configuration host group and (b) executable code of the first constituent service to be deployed to the particular number of multi-tenant hosts.

2. The system as recited in claim 1, wherein the one or more computing devices include further instructions that upon execution on or across the one or more computing devices:

provide, via a programmatic interface of the scalability management service, an indication of the first resource scaling unit.

3. The system as recited in claim 1, wherein the one or more computing devices include further instructions that upon execution on or across the one or more computing devices:

obtain approval, via a programmatic interface, of a formula for estimating, with respect to the first resource scaling unit, the particular number of multi-tenant hosts which are to be added to the particular uniform-configuration host group in response to a particular change in workload level of the first application.

4. The system as recited in claim 1, wherein the one or more computing devices include further instructions that upon execution on or across the one or more computing devices:

obtain results of a stress test which indicate a capacity limit of a multi-tenant host of the particular uniform-configuration host group for processing service requests of the first constituent service, wherein the particular number of multi-tenant hosts of the particular uniform-configuration host group which are to be added is determined using at least the capacity limit.

5. The system as recited in claim 1, wherein the first application comprises one of: (a) a financial transactions management application, (b) a retail store management application, (c) a supply-chain management application or (d) a warehouse management application.

6. A computer-implemented method, comprising:

receiving, at a scalability management service, a request for performing scalability analysis of a first constituent service of a first application at a first deployment environment, wherein the first constituent service is deployed to a plurality of uniform-configuration host groups of the first deployment environment, wherein individual uniform-configuration host groups of the plurality of uniform-configuration host groups comprise a respective plurality of hosts with a common set of configuration settings;

determining, by the scalability management service, a first data set indicating a first collection of load balancers configured to distribute service requests among hosts of a first collection of deployment environments including the first deployment environment;

identifying, by the scalability management service, based at least in part on analysis of the first data set, a first resource scaling unit for the first deployment environment, wherein the first resource scaling unit indicates a first set of uniform-configuration host groups including at least a particular uniform-configuration host group of the plurality of uniform-configuration host groups, such that individual hosts in the first set of uniform-configuration host groups of the plurality of uniform-configuration host groups the first constituent service is deployed to have the same estimated workload level of service requests as other hosts of the first set of uniform-configuration host groups of the plurality of uniform-configuration host groups that the first constituent service is deployed to, wherein service requests of a workload of an individual host of the first set of uniform-configuration host groups are transmitted to the individual host by a first set of load balancers configured to distribute service requests of one or more deployment environments including the first deployment environment;

in response to obtaining a forecast of a change in workload level of the first application, determining, by the scalability management service, using at least the first resource scaling unit, a number of hosts which are to be added to the particular uniform-configuration host group to respond to the change in workload level; and cause, by the scalability management service, the number of hosts to be added to the particular uniform-configuration host group.

7. The computer-implemented method as recited in claim 6, further comprising:

obtaining results of a stress test which indicate a capacity limit of a host of the particular uniform-configuration host group for processing service requests of the first constituent service, wherein the number of hosts of the particular uniform-configuration host group which are to be added is determined using at least the capacity limit.

8. The computer-implemented method as recited in claim 6, further comprising:

identifying, by the scalability management service, based at least in part on analysis of the first data set, a second resource scaling unit which applies to a plurality of deployment environments, wherein the plurality of deployment environments includes a second deployment environment established for one or more constituent services of the first application, wherein the plurality of deployment environments includes a third deployment environment established for one or more constituent services of the first application, wherein the second resource scaling unit indicates another uniform-configuration host group, wherein individual hosts of the other uniform-configuration host group process service requests of both the second deployment environment and the third deployment environment; and determining, by the scalability management service, using at least (a) the second resource scaling unit and (b) a mapping between a workload level of the first application and respective workload levels of the second deployment environment and the third deployment environment, a number of hosts to be added to the other uniform-configuration host group to process the change in workload indicated in the forecast.

9. The computer-implemented method as recited in claim 6, further comprising:

providing, via a programmatic interface of the scalability management service, an indication of the first resource scaling unit.

10. The computer-implemented method as recited in claim 6, further comprising:

determining, by the scalability management service, based at least in part on a mapping between respective workload levels of the first constituent service and a second constituent service of the first application, a number of additional hosts to be added to a uniform-configuration host group of a second deployment environment to respond to the change in workload indicated in the forecast, wherein the second constituent service is deployed at the second deployment environment.

11. The computer-implemented method as recited in claim 6, further comprising:

obtaining approval, via a programmatic interface, of a formula for computing, with respect to the first resource scaling unit, the number of hosts which are to be added to the particular uniform-configuration host group.

12. The computer-implemented method as recited in claim 6, further comprising:

training, using timestamped records of client requests of the first application, a machine learning model to generate the forecast of the change in workload level.

13. The computer-implemented method as recited in claim 6, further comprising:

in response to obtaining the forecast of the change in workload level of the first application, determining, by the scalability management service, using at least (a) the first resource scaling unit and (b) a mapping between the workload level of the first constituent service and a workload level of one or more resources other than hosts, a configuration change to be performed to respond to the change in workload level.

14. The computer-implemented method as recited in claim 13, wherein the configuration change includes one or more of: (a) changing a number of load balancers, (b) changing a number of database instances, (c) changing a number of storage devices, (d) changing a rate limit or (e) changing a thread count limit.

15. The computer-implemented method as recited in claim 6, wherein the particular uniform-configuration host group includes hosts of a virtualized computing service of a cloud computing environment.

16. One or more non-transitory computer-accessible storage media storing program instructions that when executed on or across one or more processors:

receive a request to perform scalability analysis of a constituent service of an application at a first deployment environment, wherein the constituent service is deployed to a plurality of host groups of the first deployment environment;

determine a data set indicating a collection of front end request routers configured to distribute service requests among hosts of a collection of deployment environments including the first deployment environment;

identify, based at least in part on analysis of the data set, a resource scaling unit for the first deployment environment, wherein the resource scaling unit indicates a set of host groups including at least a particular host group of the plurality of host groups, such that individual hosts in the set of host groups of the plurality of host groups the constituent service is deployed to have the same estimated workload level of service requests as other hosts of the set of host groups of the plurality of host groups that the constituent service is deployed to, and wherein service requests of a workload of an individual host of the set of host groups are transmitted to the individual host by a set of front end request routers configured to distribute service requests of one or more deployment environments including the first deployment environment; and cause, based on the resource scaling unit and information indicating a workload level for the application, a number of hosts to be added to the particular host group.

17. The one or more non-transitory computer-accessible storage media as recited in claim 16, wherein the resource scaling unit is identified at a network-accessible service of a cloud provider network.

18. The one or more non-transitory computer-accessible storage media as recited in claim 16, wherein the application comprises one of: (a) a financial transactions management application, (b) a retail store management application, (c) a supply-chain management application or (d) a warehouse management application.

19. The one or more non-transitory computer-accessible storage media as recited in claim 16, storing further program instructions that when executed on or across one or more processors:

provide, via a programmatic interface of a scalability management service, an indication of the resource scaling unit.

20. The one or more non-transitory computer-accessible storage media as recited in claim 16, storing further program instructions that when executed on or across one or more processors:

obtain approval, via a programmatic interface, of a formula for computing, with respect to the resource scaling unit, a number of hosts which are to be added to the particular host group.

* * * * *